US006385641B1

(12) United States Patent
Jiang et al.

(10) Patent No.: US 6,385,641 B1
(45) Date of Patent: May 7, 2002

(54) ADAPTIVE PREFETCHING FOR COMPUTER NETWORK AND WEB BROWSING WITH A GRAPHIC USER INTERFACE

(75) Inventors: Zhimei Jiang; Leonard Kleinrock, both of Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/092,108

(22) Filed: Jun. 5, 1998

(51) Int. Cl.[7] .................. G06F 15/16; G06F 15/177
(52) U.S. Cl. ......................... 709/203; 709/219
(58) Field of Search .............................. 709/226, 229, 709/203, 219, 217

(56) References Cited

U.S. PATENT DOCUMENTS

| | | | | |
|---|---|---|---|---|
| 5,802,292 A | * | 9/1998 | Mogul ..................... | 709/203 |
| 5,812,776 A | * | 9/1998 | Giffford ................... | 709/217 |
| 5,878,223 A | * | 3/1999 | Becker et al. ............ | 709/223 |
| 5,946,686 A | * | 8/1999 | Schmuck et al. ......... | 709/229 |
| 5,978,567 A | * | 11/1999 | Rebane et al. ............ | 709/219 |
| 6,085,226 A | * | 7/2000 | Horvitz .................... | 709/203 |
| 6,134,643 A | * | 10/2000 | Kedem et al. ............ | 711/213 |
| 6,151,603 A | * | 11/2000 | Wolfe ...................... | 707/10 |
| 6,182,122 B1 | * | 1/2001 | Berstis ..................... | 709/217 |
| 6,182,133 B1 | * | 1/2001 | Horvitz .................... | 709/223 |

OTHER PUBLICATIONS

Baskett et al., "The AO Inversion Model of Program Paging Behavior", Computer Science DepartmenT—Stanford University, California, pp. 1–30, Nov. 1976.*

Bestavros, Azer, "Speculative Data Dissemination and Service to Reduce Server Load, Network Traffic and Service Time in Distributed Information Systems", Proceedings of ICDE 96: The International Conference on Data Engineering, LouisIana, pp. 1–8, Mar. 1996.*

* cited by examiner

*Primary Examiner*—Mark H. Rinehart
*Assistant Examiner*—Marc D. Thompson
(74) *Attorney, Agent, or Firm*—Daniel L. Dawes; Myers Dawes & Andras LLP

(57) ABSTRACT

The present invention is based on a prefetching scheme consisting of two modules: a prediction module and a threshold module. After a use's request for a new file is satisfied, the prediction module immediately updates a database of history information if needed, and computes the access probability for each candidate file, where the access probability of a file is an estimate of the probability with which that file will be requested by the user in the near future. Next the threshold module determines the prefetch threshold for each related server, which contains at least one candidate file with nonzero access probability. The threshold is determined in real time based on then current network conditions. Finally, each file whose access probability exceeds or equals its server's prefetch threshold is prefetched. When prefetching a file, the file is actually downloaded if and only if no up-to-date version of the file is available on the local computer; otherwise no action is taken. Although web browsing is an important application for prefetching, the prefetch scheme of the present invention may be advantageously applied to any network application in which prefetching is possible.

12 Claims, 15 Drawing Sheets

ADAPTIVE PREFETCHING FOR COMPUTER NETWORK AND WEB BROWSING WITH A GRAPHIC USER INTERFACE

BACKGROUND OF THE INVENTION

1. Field of the Invention

The present invention is in the area of computer software and more particularly involves software to minimize user waiting for information transmitted over computer networks by anticipating user requests.

2. Description of Problem and Related Art

Due to the rapid growth of the World Wide Web (WWW), there has been a large increase in the amount of information transmitted over the Internet. However, the growth of Internet capacity is not keeping pace so that users often experience long delays in retrieving files from remote machines when running network related applications. Among these network applications, the most popular ones are web browsing and accessing email and news groups. Sometimes, the waiting does not end even when the files have been transferred to the local computer. For example, after an access, the client machine may need to decompress the received files, compile Java programs, etc. On the other hand, during the time interval between two network accesses users will be viewing the information just downloaded and the local computer is generally idle. The key idea of prefetching is to take advantage of these idle periods to fetch the files that will very likely be requested in the near future, so that the user's average waiting time can be reduced. More specifically, if we add some intelligence to the network applications so that whenever the user requests a block of information (a file, an email message, etc.), the system can estimate what additional information (files, messages, etc.)[1] will be needed in the next few user accesses and transmit some of them to the local computer beforehand, according to certain criteria. If the prefetched information is indeed requested, the user can access it with negligible delay. In addition, prefetch allows more time for sophisticated processing including encryption, compression, and compilation to be carried out at both server and client sites, so that data can be transmitted more efficiently and securely without increasing the delay to the user.

[1] For simplicity, in the rest of this specification, we use the term "file" to represent a block of information whether it is a file, directory listing, web page, or other information requested by the user.

The idea of prefetching stems from the fact that, after retrieving a page from the remote server, a user usually spends some time viewing the page, and during this period the local computer as well as network link is generally idle. If we can take advantage of this phenomenon by fetching some files that will likely be accessed soon using the otherwise idle system, in other words, prefetching them to the local computer, then there will be no transmission delay when the user actually requests these files. In addition, prefetched files can immediately be processed if decryption or decompression is needed, or if any Java applets need to be handled. This allows further reduction in the delay of loading a page. These are some of the benefits of prefetching. However, the problem is, since the prediction can not be perfect, some of the prefetched files are never used and prefetching increases the system load. At some point, this increase in load may increase the delay of normal (non-prefetching) requests significantly and may eventually cause the overall system performance to degrade. Therefore, the key challenge in prefetching is to determine what to prefetch so that improvement in performance will occur.

If we knew exactly which files a user needed next, we would retrieve only those files in advance. Assuming that the prefetch operation always finishes before the user requests the next file, then we would enjoy zero latency with no extra bandwidth consumption. Unfortunately, in reality, some prefetched information may never be used resulting in wasted bandwidth and increased delay to normal (non-prefetch) requests. This indicates that the prefetch problem has two aspects. The first one is how to estimate the probability of each file being accessed in the near future. In general, this probability changes with time as the user issues new requests. The second aspect is how to determine which files to prefetch so that the overall system performance can be optimized relative to some criteria. Previous studies on Internet prefetch focus only on the first aspect of the problem and either use a fixed threshold or prefetch a fixed number of the most popular links on a page [2, 7, 8] In the prior art PeakJet prefetching software for web browsers all available links on a page being viewed are prefetched [9]. If everyone were to employ this method, there would be unacceptable surges in network traffic. In fact, prefetching without caution could be disastrous to the network.

BRIEF SUMMARY OF THE INVENTION

The prefetch scheme of the present invention consists of two modules: a prediction module and a threshold module. A simplified flow diagram is shown in FIG. 14. The complete scheme works as follows. After a user's request for a new file is satisfied, the prediction module immediately updates a database of history information if needed, and computes the access probability for each candidate file, where the access probability of a file is an estimate of the probability with which that file will be requested by the user in the near future. Different applications may use different prediction algorithms in this module. Next the threshold module determines the prefetch threshold for each related server, which contains at least one candidate file with nonzero access probability. The threshold is determined in real time based on then current network conditions. The algorithm used in the threshold module is independent of the application. Finally, each file whose access probability exceeds or equals its server's prefetch threshold is prefetched. When prefetching a file, the file is actually downloaded if and only if no up-to-date version of the file is available on the local computer; otherwise no action is taken. Although web browsing is an important application for prefetching, the prefetch scheme of the present invention may be advantageously applied to any network application in which prefetching is possible. In general, for different applications, different prediction algorithms may be developed, while the same threshold algorithm can be employed throughout, with the same prefetching criteria always achieving the optimum performance.

To achieve high efficiency with prefetching, in the prediction module, one uses an algorithm to predict the access probability of each file as accurately as possible. In the threshold module, the prefetch threshold for each related server is computed. We have derived an upper bound for the prefetch threshold that is a function of system load, capacity, and cost of a time unit and a system resource unit to the user. Files with access probability greater than its server's prefetch threshold are prefetched. By doing so, a lower average cost can always be achieved. We tested the performance of our prediction algorithm for web browsing by setting the prefetch threshold at various values. The results show that generally, using the access probabilities from the client can ensure that a large portion of prefetched files are used, while the access probabilities from the server can help improve the number of user requests satisfied by the prefetched files.

Prefetch is a good approach to reduce latency for network applications. However, it must be implemented in a way such that the overall system performance can be improved, and the tradeoff between saving user's time and the bandwidth usage must be considered. Applications of this approach go beyond mere prefetching. In the case of a push server or push caching it is important to study overall efficiency. This means not only the percentage of the pushed files being used, but also, and more importantly, the impact of pushing on other users who are sharing the same network but may or may not be able to use these pushed files at all. As in most of the other prefetch algorithms, most commercial push servers use fixed (possibly customized by the user) values to determine what and when to push, without taking into account the network conditions at the time. This will almost certainly not achieve the best efficiency for the overall system. Clearly, the solution to this problem is adaptivity:—adaptation to the user's behavior and adoption to the network conditions. This is also a goal of our prefetch scheme. In fact, we can use the same kind of approach for the threshold algorithm to analyze the push server or push caching problem. As more functions like prefetching or pushing are added to the network applications, it is very important to consider the tradeoffs involved as we have shown here.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Figure 1:
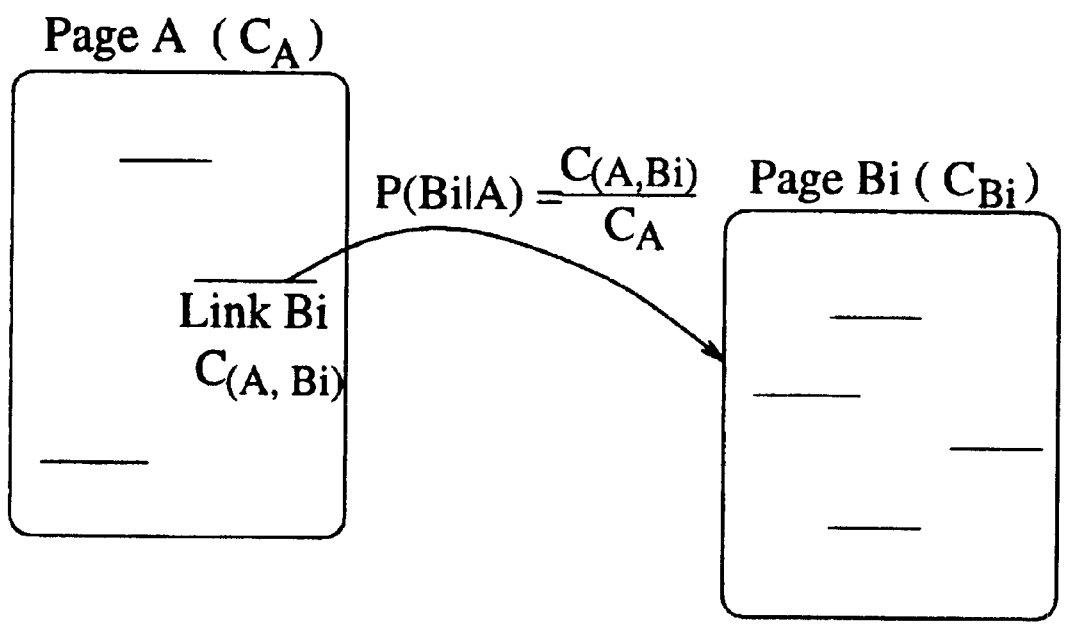
FIG. 1 shows a diagrammatic representation of a prediction algorithm optimized for web browsing.

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved prefetching method and device for use on computer networks.

The Prediction Module

The task of the prediction module is to keep track of the user's access history and to compute access probabilities to determine which files to prefetch. Different prediction algorithms can be designed for different applications. An application that handles email may assign each message a probability based on certain criteria, for example the latest/earliest message has the largest probability, or messages with a subject similar to the one being read have larger probabilities, etc. Thus, while a user is reading an email, the messages he might read in the near future can be prefetched. When a user logs in to a remote machine and switches to a particular directory, the files and subdirectories in that directory would be assigned certain access probabilities, and some of them would be prefetched since the user might need them soon. Web browsing is an application where sophisticated prediction is especially necessary. We derive an algorithm particularly suited to web browsing by defining the access probability, $p(B|A)$, as the conditional probability that page B will be requested by the user in the near future given that page A is currently being viewed. Our prediction algorithm is based on the fact that typical web surfing involves a sequence of clicking and downloading operations. Namely, first the user clicks on a link, and a new page is downloaded. After viewing the new page, the user usually clicks on a link on this page to download another new page. Sometimes, the user may use the back or forward buttons on the browser to go to some previous page and then click on another link on that page. Rarely does the user type in a URL (Uniform Resource Locator) to switch to a new page. We take advantage of this feature by only keeping track of the click (link selection) operations and assuming that $p(B|A)$ is zero if no link exists on page A to page B. In other words, whenever a new page is displayed, the candidate files we consider include only those which are directly linked to this page. In our current algorithm, the access probabilities for embedded images or programs have been set to zero, but they could also be prefetched when the page that includes them is prefetched.

Previous workers [2, 8] have studied prediction algorithms for the WWW. Parameters roughly similar to access probability are defined in these works. However, algorithms used by these workers apply windows to the access sequence, windows either in terms of time or in terms of the number of requests. Files within the same window are all considered to be dependent on each other. Since the content of each page varies greatly and how pages are browsed differs from user to user, it is difficult or impossible to adjust the size of the time window. In the WWW, after an html (hypertext markup language) file is downloaded, images embedded in the file are downloaded immediately. Therefore, the request window includes both html files and embedded images, which also makes it difficult to determine size of the request window. Since both algorithms keep all access pairs that are in the same window for future prediction, the memory space required could be as large as the square of the total number of files requested.

Our scheme operates differently and is similar to using a request window of size two after removing all the requests that were not sent explicitly by the user (for example, those for embedded images, etc.) from the request sequence and eliminating all the unrelated pairs of requests. The latter can be accomplished because we keep track of each request as well as the page from which the request was initiated by selecting a link. It is easy to get this information at the client site. Note that the page from which a request is initiated may not be the previous one in the request sequence, since the user can click the back button on the browser to go back to an earlier page. Assuming the number of links on a page is bounded, our algorithm requires memory space linear to the number of pages on the server as opposed to the square of the number of files as in the prior art.

The details of the prediction algorithm are as follows. For each client, in order to collect the history information for prediction, the algorithm maintains two kinds of counters, the page counter and the link counter. More specifically, each page A is associated with a page counter $C_A$. In addition, if page B can be accessed directly from page A, namely there exists a link on page A pointing to page B, then and only then is there a link counter $C_{(A,B)}$ for the pair. Whenever page A is downloaded, $C_A$ is increased by one. In addition, if page B is accessed by clicking on the corresponding link on page A, $C_{(A,B)}$ is also increased by one. The access probabilities are obtained in the following way. When a page, A is being viewed by the user, for each page $B_i$ linked to A, the access probability of $B_i$ is computed as $$p(Bi \mid A) = \min\left(1, \frac{C_{(A,B_i)}}{C_A}\right)$$

for $C_A \geq 5$, and 0 for $C_A < 5$. All files which are not linked to the page being viewed have access probability zero. The values of the counters are based on the access history during a certain period of time, for example, the last 30 days. The algorithm is also illustrated graphically in FIG. 1. Note that for a page A with k distinct links $(B_1, B_2, \ldots, B_k)$, $$\sum_{i=1}^{k} P\{B_i \mid A\}$$

can be greater than one. This is because a user may click link $B_i$ on page A and come back (back button) later to go to another link $B_j$ through A. Therefore, while page A is retrieved from the server only once, more than one file might be accessed from page A.

The prediction algorithm described above is intended for the client site browser. The same algorithm can also be implemented at the server site, where each server aggregates the access histories of all users to its pages and computes the access probabilities accordingly. The only difficulty at the server is that it is not straightforward to find out from which page a request was initiated. The best way to get this information is to require the client to include it in the file request. However, if we do not wish to change the current http protocol used to request files, we can have the server keep track of the last page request from each of a certain number of users who accessed it most recently. When a new request from a tracked user arrives, the server assumes it was initiated from the previous page requested by that user if such a link exists.

Clearly, the access probabilities generated by the client site indicate the user's personal interests, while those generated by the server site represent the popularity of the files over many users that have accessed that server. If a client has not visited a page often enough to obtain reliable access probabilities, the server's access probabilities are likely to be more accurate. Access probabilities from the server and client can be merged in the following way at the client site. If a page has been visited fewer than five times by the client, and the access probabilities of its links are available at the server, then the probabilities available at the server are be used. Otherwise, the access probabilities from the client are used. More sophisticated algorithms may be developed to do this merging. The algorithm just described in this section is an essential component of a complete prediction algorithm for web browsing. More functions may be added for better prediction. The prediction algorithm demonstrates that to predict a user's behavior in web browsing, it is not sufficient to just look at the sequence of requests independently, one must take advantage of the underlying link relations between pages to achieve better performance.

The Threshold Module

The prefetching scheme of the present invention tries to optimize the tradeoff between system resource (network link, server etc.) usage and latency, by predicting which files are likely to be needed soon and choosing some of them to download beforehand. The prediction module accomplishes the first part of this task as we discussed above. In the threshold module, we determine the prefetch threshold for the server in real time to determine which files to prefetch. Unlike the prediction module, the algorithm used in the threshold module is the same for all applications. To optimize the tradeoff between system resource usage and latency, we choose to measure the system performance in terms of cost which is comprised of the delay cost, $\alpha_T$, expressed in cost per unit time ($/time) and the system resource cost, $\alpha_B$, expressed as cost per unit of system resource ($/packet). The delay cost indicates how much the user suffers waiting for files. The system resource cost includes the cost of processing the packets at the end nodes and that of transmitting them from the source to the destination. The goal of the algorithm is to determine which files to prefetch to minimize the average cost of requesting a file.

Previous work on prefetch uses either a fixed threshold for all servers or prefetches a fixed number of files each time. The problem with these approaches is that they do not consider factors like system load and capacity, which can greatly affect the performance of prefetching. For example, we should be more cautious in prefetching files when the system load is high because the additional load of prefetching can overload the system. In our algorithm, we compute the prefetch thresholds based on the network conditions in real time. Unless indicated otherwise, we assume that prefetches triggered by the previous request always finish before the user sends out the next request. In addition, we assume that when a prefetched file is requested for the first time, it is always up-to-date. We also assume infinite storage space at the client, so prefetched files are never deleted. These assumptions imply that the first request to a prefetched file will always result in a hit.

The Single User System

In a single user system, the total cost c of requesting a file is the sum of the system resource cost and the delay cost of waiting for the file to arrive.[2] Therefore, if the user requests a file that is not available in the local computer, the total cost of retrieving the file is $$c = \alpha_B \cdot s + \alpha_T \cdot (t + t_0) = \alpha_B \cdot s + \alpha_T \cdot (s/b + t_0) \quad (1)$$

where s is the file size, t is the transmission time, $t_0$ is the startup time required to deliver any file, and b is the capacity of the path to the server (packets/time unit). Assuming the cost of using a file stored on the local disk is negligible, if the requested file had previously been prefetched and saved on the local cache, then the cost associated with this request equals the system resource cost, because the delay cost is zero.

$$c_2 = \alpha_B \cdot s \quad (2)$$

[2] We assume the processing delay is zero after the file has been received.

Consider the situation in which the user has just started using a new file, and currently there are L distinct files in the system with access probability greater than zero. The average cost, C, of satisfying all user requests stemming from this new file being used without any prefetching, is the summation of the costs to retrieve each of the L files times the access probability of the corresponding file,[3] i.e., $$C = \sum_{i=1}^{L} p_i \cdot \left[ \alpha_B \cdot s_i + \alpha_T \cdot \left( \frac{s_i}{b_i} + t_{0_i} \right) \right] \quad (3)$$

where $p_i$ is the access probability of file i, $t_{0_i}$ is the start up time for retrieving ith file, and $b_i$ is the capacity of the path to the server which contains the ith file.

[3] A file can be viewed more than once. Since we have assumed that the cost of a request which does not invoke file transfer is negligible, when the file is requested again, if the copy the user viewed last time is still available on the local cache and up-to-date, the cost for this request is zero regardless of whether the first request was satisfied by a prefetched file or not. Therefore, we do not need to consider this case in the cost function. If there is not an up-to-date copy of the file that is available locally, the request is treated as a new request.}.

If instead, m files among all the L candidate files are prefetched, say $i_1, i_2, \ldots, i_m$, this average cost becomes $$C = \sum_{j=1}^{m} \alpha_B \cdot s_{i_j} + \sum_{j=m+1}^{L} p_{i_j} \cdot \left[ \alpha_B \cdot s_{i_j} + \alpha_T \cdot \left( t_{i_j} + t_{0_{i_j}} \right) \right] \quad (4)$$

where $i_j \in \{1, \ldots, L\}, j = 1 \ldots L$, and for any $j_1 \neq j_2, i_{j_1} \neq i_{j_2}$. Note that these L files could be on different servers and, they are the only files that may be prefetched because we never prefetch files with an access probability of zero.

Comparing (3) and (4), we conclude that the average cost is minimized if and only if we prefetch all and only those files that satisfy $$p_i > \frac{1}{\frac{\alpha_T}{\alpha_B \cdot b_i} \left( 1 + \frac{s_{0_i}}{s_i} \right) + 1} \quad (5)$$

where $s_{0_i} = b_i \cdot t_{0_i}$, and $b_i$ is the capacity of the path to server i. We define the prefetch threshold $$H = \frac{1}{\frac{\alpha_T}{\alpha_B \cdot b_i} \left( 1 + \frac{s_{0_i}}{s_i} \right) + 1} \quad \text{and} \quad r = \frac{\alpha_T}{\alpha_B}.$$

Figure 2:
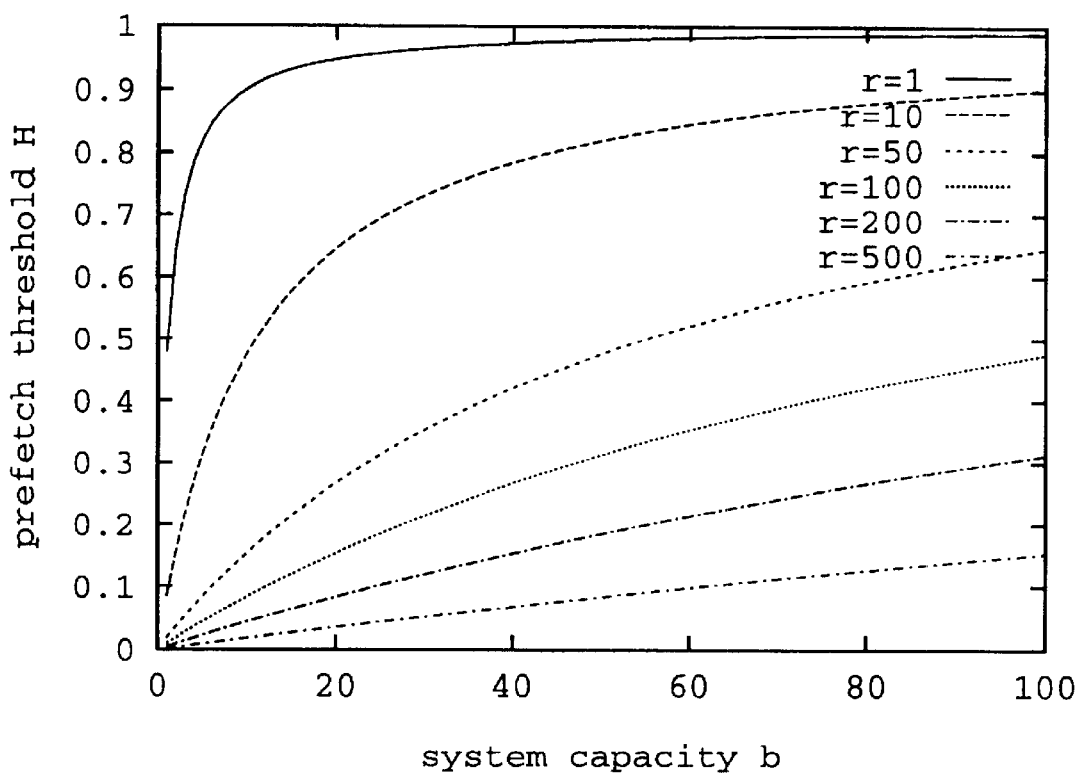
FIG. 2 shows a plot of prefetch threshold H as a function of system capacity in a single user system.

In FIG. 2, the prefetch threshold (H) is plotted as a function of the available bandwidth b, for several values of $$r \left( = \frac{\alpha_T}{\alpha_B} \right) \text{ at } \frac{s_{0_i}}{s_i} = 0.1.$$

Note that, the ratio $$\frac{\alpha_T}{\alpha_B}$$

indicates how valuable time is compared to the system resources.

FIG. 2 shows that, for fixed $$\frac{\alpha_T}{\alpha_B},$$

more files should be prefetched from a server to which the capacity of the path is smaller, because it takes longer for the user to fetch the file himself. In addition, the larger the ratio $$\frac{\alpha_T}{\alpha_B},$$

that is, the more expensive time is relative to the system resources, the lower the prefetch threshold is for fixed bandwidth.

The Multi-user System

Figure 3:
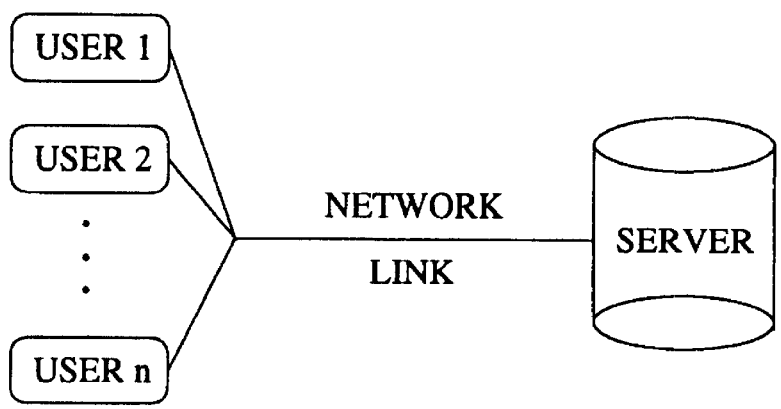
FIG. 3 is a diagrammatic representation of multiple users linked to a single server.
Figure 4:
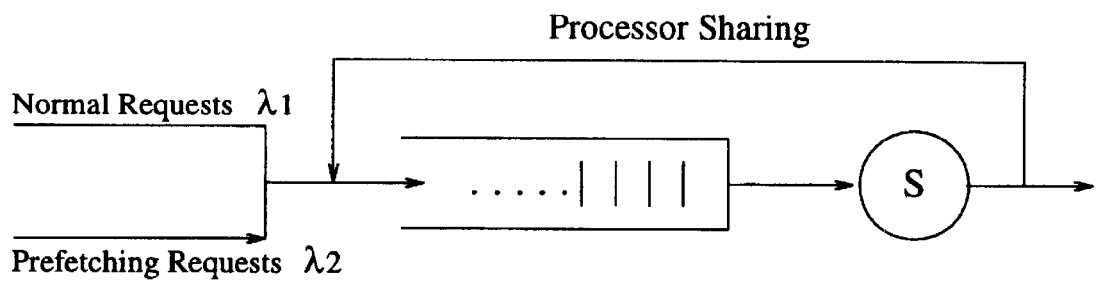
FIG. 4 is a diagrammatic model of a prefetch system.

In a single user system, the available bandwidth to each server is always the full capacity of the path. In a multi-user system where system resources are shared among users, prefetching increases the delay of other users' normal (e.g., nonprefetch) requests. Therefore, different criteria must be used to determine which files to prefetch in such a system. The multi-user system described here consists of a single server and multiple users who share the same server and the network link as shown in FIG. 3. Users issue requests for files on the shared server. Each user's local system can prefetch files while the user is working. We can model this prefetch system as an M/G/1 Round-Robin processor-sharing system with two Poisson inputs, shown as a simple model in FIG. 4, where the server S in the diagram represents both the network link and the server in the real system. The server S handles two kinds of requests (inputs): normal requests $\lambda_1$, which are those user requests that can't be satisfied by the prefetched files in the local computer, and prefetch requests $\lambda_2$, which are the requests sent by the prefetch program. All requests to the server are of the same priority and they join the same queue waiting for service. We assume that those user requests that do not invoke a file transfer consume very little resources and are negligible. Thus, if a prefetched file can satisfy a user request, no cost is added to the system. We start with a special kind of system in which, at any time, the access probability of each file is either exactly p(p>0) or 0, where p is fixed within one system but can vary for different systems. Files with access probability zero may actually be requested by the user but they are never prefetched. This implies that for a given system and its p, all the prefetched files will be requested by the user with the same probability p. For simplicity, we initially assume that the startup time $t_0$ is zero. The result for the system with nonzero startup time is given below. Let us now derive the prefetch threshold step by step.

a) The Cost Function C

For a given system, let λ be the arrival rate of the file requests from the users when no prefetch is applied. We assume that prefetch does not affect the user's behavior regarding the likelihood of accessing files. In other words, when prefetching is employed, users still issue requests at rate $\lambda$ in the same pattern, although they can get some files faster due to prefetching. Let the arrival rate of normal requests and prefetch requests be $\lambda_1$ and $\lambda_2$ respectively. Hence the rate at which user requests are satisfied by the prefetched files is $\lambda-\lambda_1$, which is simply $p\lambda_2$ because prefetched files are eventually requested by the user with probability p, where p is the access probability of the prefetched files. Thus $\lambda_1+p\cdot\lambda_2=\lambda$ or $$\lambda_1+\lambda_2=\lambda+(1-p)\lambda_2 \qquad (6)$$

where $\lambda_1+\lambda_2$ must be less than b/s in order to keep the system in a stable state.

In a Round-Robin processor-sharing system, the average response time for requests requiring an average of x time units of processing is $$t = \frac{x}{1-\rho} = \frac{s}{b(1-\rho)} \qquad (7)$$

where $\rho$ is the system load, s is the average file size, and b is the system capacity [5, 6]. For the system shown in FIG. 4, $\rho=s(\lambda_1+\lambda_2)/b$. This implies that, in a multi-user system, the cost of a normal request, which is the sum of the system resource cost and the delay cost, becomes $$c_1 = \alpha_B \cdot s + \alpha_T \cdot t = \alpha_B \cdot s + \alpha_T \cdot \frac{s}{b-(\lambda_1+\lambda_2)s} \qquad (8)$$

where $b>(\lambda_1+\lambda_2)s$. Notice that in equation (8), the effect of prefetching on the entire system is considered by including $\lambda_2$ in the formula. As more files are prefetched, the cost of normal requests increases because prefetching increases the system load, hence the delay of retrieving files increases. The average cost of a prefetch request is (9).

$$c_2=\alpha_B\cdot s \qquad (9)$$

Since users issue requests with rate $\lambda$ and some of them ($p\lambda_2$) are satisfied by prefetched files, the rest ($\lambda_1$) are sent to the server as normal requests; by equations (6), (8), and (9), we obtain that the average cost of an explicit user request is $$C = \frac{\lambda_1 \cdot c_1 + \lambda_2 \cdot c_2}{\lambda} \qquad (10)$$

$$= \frac{s}{\lambda}(\lambda+(1-p)\lambda_2)\alpha_B + \frac{(\lambda-p\lambda_2)\alpha_T}{b-(\lambda+(1-p)\lambda_2)s}$$

Figure 5:
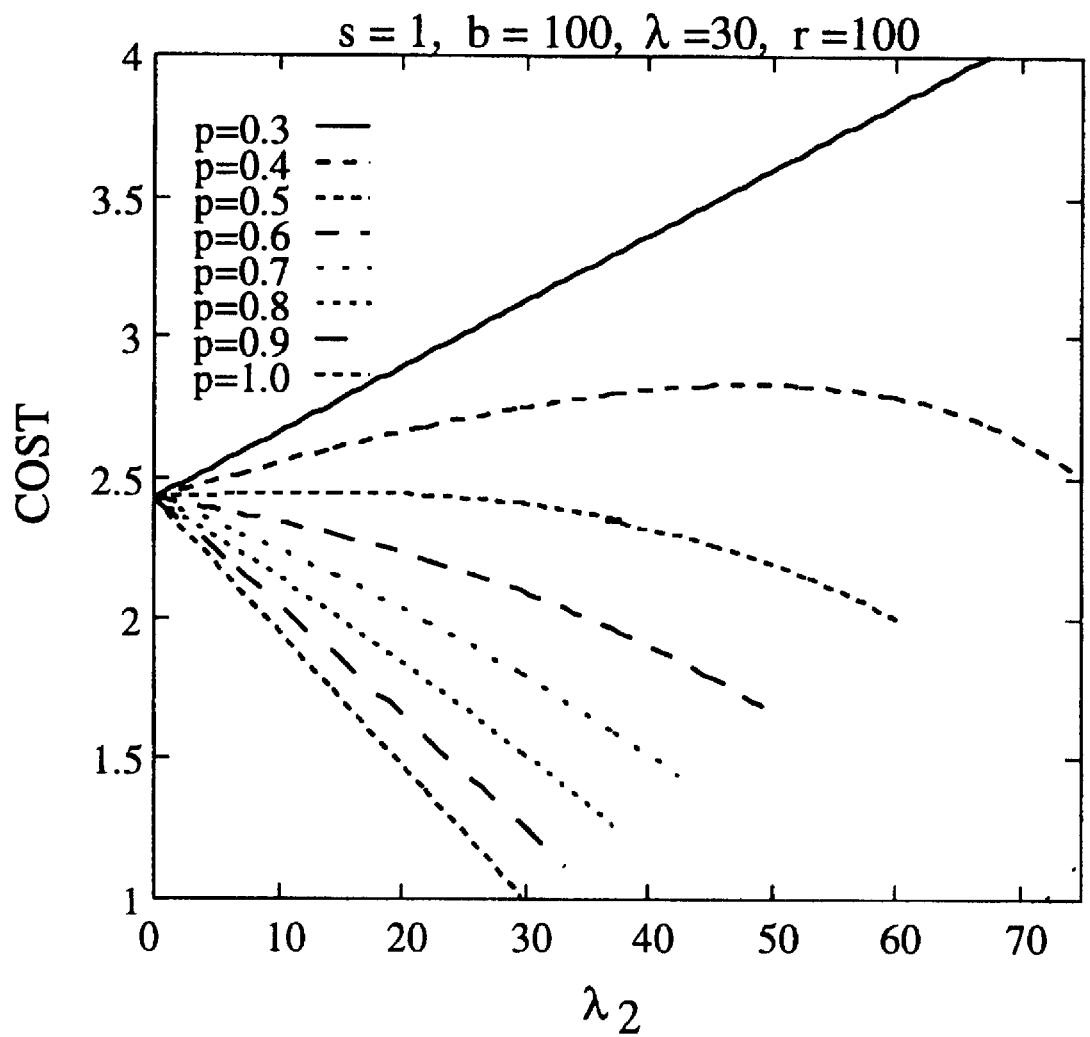
FIG. 5 shows a plot of cost for user requests as a function of prefetch rate.

This equation for the average cost C is plotted in FIG. 5 as a function of $\lambda_2$ for several values of p. Note that for equation (10), the valid range of $\lambda_2$ is $$0 \leq \lambda_2 \leq \frac{\lambda}{p} \text{ for } 0 < p \leq 1.$$

b) The Optimum Value of the Prefetch Rate $\lambda_2$.

Assume p and $\lambda$ are known, we wish to find the value of the prefetch rate $\lambda_2$ which minimizes the average cost of each request in the system. Once $\lambda_2$ is determined, $\lambda_1$ can be computed by $\lambda_1=\lambda-p\lambda_2$ according to (6).

From equation (10), clearly, at p=1, C is minimized when $\lambda_2=\lambda$, i.e. all the files which have access probability 1 should be prefetched. On the other hand, if p=0, C is minimized when $\lambda_2=0$, therefore no files should be prefetched. For 0<p<1, we consider the following. From equation (10), we take the derivative of C with respect to $\lambda_2$ to obtain $$\frac{dC}{d\lambda_2} = \frac{s}{\lambda}\left[(1-p)\alpha_B + \frac{\alpha_T(\lambda s - pb)}{(b-(\lambda+(1-p)\lambda_2)s)^2}\right] \qquad (11)$$

Differentiating (11) again, we get $$\frac{d^2C}{d^2\lambda_2} = \frac{2s^2}{\lambda}\left[\frac{\alpha_T(1-p)(\lambda s - pb)}{(b-(\lambda+(1-p)\lambda_2)s)^3}\right] \qquad (12)$$

In a stable system, $$(\lambda+(1-p)\lambda_2)s=(\lambda_1+\lambda_2)s$$

must be less than b. Therefore, equation (12) shows that for $$pb>\lambda_s (0<p\leq 1),$$

$$\frac{d^2C}{d^2\lambda_2}$$

is always less than zero. This implies that equation (10) is maximized at $$\frac{dC}{d\lambda_2} = 0$$

when $pb>\lambda s$. Solving $$\frac{dC}{d\lambda_2} = 0$$

for $\lambda_2$, we obtain the critical value $\lambda'_2$, which is given by $$\lambda_2 = \frac{1}{(1-p)s}\left(b-\lambda s - \sqrt{\frac{(pb-\lambda s)\alpha_T}{(1-p)\alpha_B}}\right) \qquad (13)$$

Since function (10) is maximized at $\lambda'_2$, where $$\frac{dC}{d\lambda_2} = 0$$

for $pb>\lambda s$, it follows that the cost decreases $\lambda_2$ increases for $\lambda_2>\lambda'_2$. Specifically if $\lambda'_2 \leq 0$ for the given p, $\lambda$, and $$\frac{\alpha_T}{\alpha_B},$$

then for any $\lambda_2$ in the range $$\left[0, \frac{\lambda}{p}\right],$$

the higher the $\lambda_2$, i.e., the more that files with access probability p are prefetched, the lower the cost. Thus, for the given p, $\lambda_2$ and $$\frac{\alpha_T}{\alpha_B}$$

if $\lambda'_2 < 0$, prefetching all the files with access probability p will minimize the cost.

Notice that we have assumed the access probability of each file in the system is either p or 0. In addition, we assumed that files with access probability 0 may actually be requested, which implies that the rate at which files with access probability p appear in the system can be any value between 0 and 0 and $$\frac{\lambda}{p}.$$

For example, if files with access probability zero are never requested by the user, then $\lambda_2$ is equal to $$\frac{\lambda}{p}.$$

If all the files have access probabilities 0, then $\lambda_2=0$ because we never prefetch the files with access probability 0. Therefore, our conclusion may be stated as follows:

For given p, $\lambda$, and $$\frac{\alpha_T}{\alpha_B}$$

independent of the rate at which files with access probability p appear in the system, if $\lambda'_2 < 0$, then prefetching all the files with access probability p minimizes the cost.

The number of files that are actually prefetched is determined by the rate at which files with access probability p appear in the system, we do not need to know that to minimize the cost.

For given p, $\lambda$, and $$\frac{\alpha_t}{\alpha_B},$$

if $\lambda'_2 \geq \lambda/p$, the cost increases as $\lambda'_2$ increases for $\lambda_2 < \lambda/p$, therefore no files should be prefetched. If $0 < \lambda'_2 < \lambda/p$, since the access probabilities of files in the system vary for different clients and with time in a real system, it is very hard to determine if $\lambda_2$ would be greater than $\lambda'_2$ by prefetching all the files with access probability p. Therefore, the lower cost can not be guaranteed at all times, and we choose not to prefetch any file in this case.

The above result is for the case when $pb > \lambda s$. If $pb \leq \lambda s$, (11) shows that $$\frac{dC}{d\lambda_2} > 0$$

for all $\lambda_2$, which means that the cost increases monotonically $\lambda_2$ increases, therefore no files should be prefetched.

c) The Prefetch Threshold H

Let us now find the prefetch threshold H for the system with $pb \leq \lambda s$ such that for $p \geq H$, $\lambda'_2 \leq 0$ and the cost is minimized by prefetching all the files with access probabilities p. From equation (13), we obtain that $\lambda'_2 \leq 0$, i.e. (10) is maximized at $\lambda_2 < 0$. if and only if $$p \geq 1 - \frac{(1-\rho)\frac{\alpha_T}{\alpha_B}}{(1-\rho)^2 b + \frac{\alpha_T}{\alpha_B}} \quad (14)$$

where $$\rho = \frac{\lambda \cdot s}{b}.$$

We then set the prefetch threshold to be $$H = 1 - \frac{(1-\rho)\frac{\alpha_T}{\alpha_B}}{(1-\rho)^2 b + \frac{\alpha_T}{\alpha_B}} \quad (15)$$

It's easy to prove that H is always greater than $\rho$. Thus, if $p > H$, then $p > \rho$, i.e., $pb > \lambda s$. Therefore, equation (14) indicates that if the access probability p is greater than or equal to the threshold H, then $\lambda'_2 \leq 0$ according to (13). Moreover, following our previous analysis this implies that prefetching all the files with access probability p minimizes the cost for $p \geq H$. The threshold H is plotted in FIG. 6 as a function of system utilization $\rho$ for several different values of r where $$r = \frac{\alpha_T}{\alpha_B}, s = 1,$$

and b=100.

Figure 6:
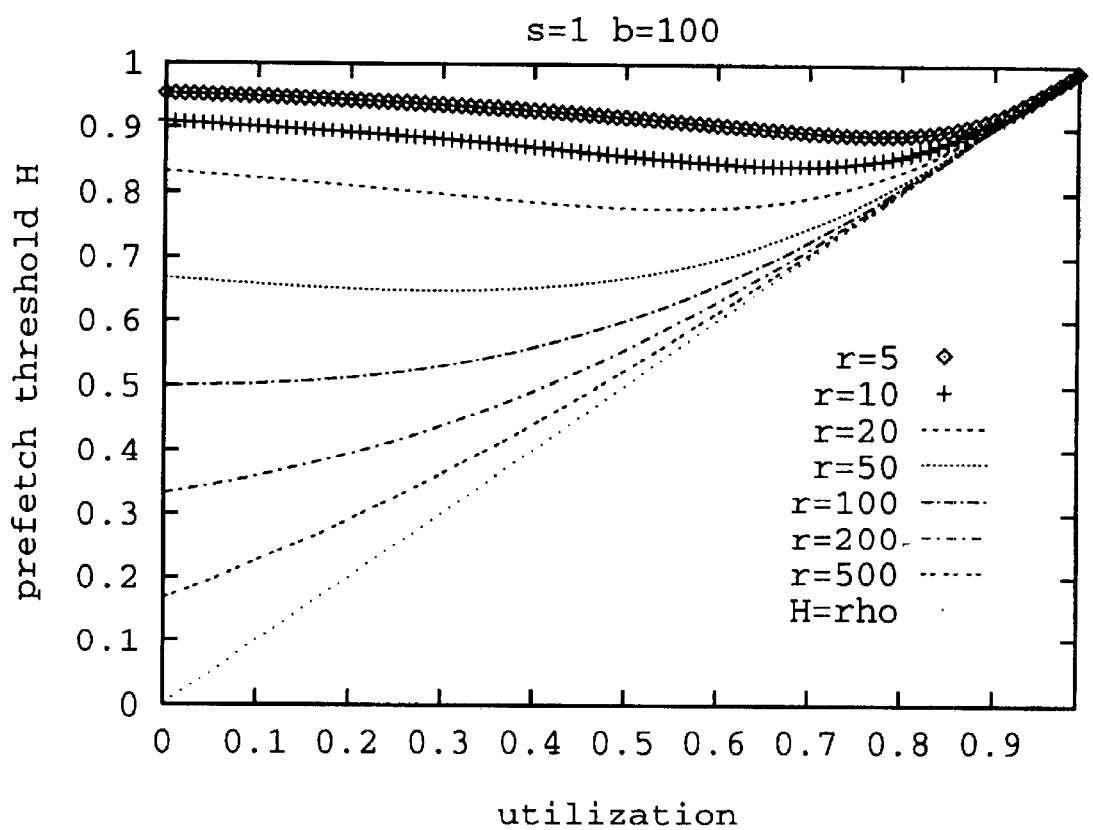
FIG. 6 shows a plot of prefetch threshold H as a function of system load.

FIG. 6 shows that as system load $\rho$ increases, the prefetch threshold H tends to increase as well, which means that fewer files should be prefetched. But the increase is not monotonic for small values of $$\frac{\alpha_T}{\alpha_B}.$$

The reason for this is that, in those cases, when the load is low, prefetching does not save much time. As the load increases, it takes longer to transmit files and prefetch can save more time, therefore the threshold decreases. As the load continues to increase, prefetching files will add relatively long delay to the normal user requests, so the threshold needs to be increased again. We can prove that the threshold may decrease as p increases from zero, if and only if $$b > \frac{\alpha_T}{\alpha_B};$$

and for fixed $$\frac{\alpha_T}{\alpha_B},$$

the threshold is minimized at $$\rho = 1 - \sqrt{\frac{\alpha_T}{\alpha_B \cdot b}}.$$

Furthermore, by comparing the prefetch threshold at $\rho=0$ and at $$\rho = 1 - \sqrt{\frac{\alpha_T}{\alpha_B \cdot b}},$$

we can show that for any $$b > \frac{\alpha_T}{\alpha_B}$$

the maximum drop in the prefetch threshold value, $$H_{\rho=1} - H_{\rho=1-\sqrt{\frac{\alpha_T}{\alpha_B \cdot b}}}, \text{ is } 0.0674.$$

In both single and multi-user systems, for fixed $$\frac{\alpha_T}{\alpha_B},$$

the higher the system capacity, the higher the prefetch threshold, because the savings of time is less in a faster system. However, only in the multi-user system is the prefetch threshold affected by system load.

d) The Upper Bound for the Prefetch Thresholds in Systems with Arbitrary Access Probability Distribution.

Up to now, we have been considering a system in which, at any time, the access probability of each file is either p or 0, where p is fixed within one system. The following theorem indicates that for an arbitrary distribution of access probabilities, where the access probability of each file in the system can be any value between 0 and 1, expression (15) gives an upper bound for the optimum prefetch threshold of this system. In other words, for any system, regardless of the actual distribution of the access probabilities, prefetching files whose access probability is greater than the system's prefetch threshold computed from (1 5) can always reduce the cost.

Theorem 1

Consider a system in which b, s, and $\lambda$ and $$\frac{\alpha_T}{\alpha_B}$$

are known. Let f(q) be the rate at which files with access probability q appear in the system, where $$\int_0^1 q f(q) dq = \lambda$$

and $0 < q \leq 1$. Expression (15), $$H = 1 - \frac{(1-\rho)\frac{\alpha_T}{\alpha_B}}{(1-\rho)^2 b + \frac{\alpha_T}{\alpha_B}}$$

is an upper bound for the optimum prefetch threshold of this system.

This theorem can be proved based on our previous result. The details of the proof are given in appendix A. Unlike the system we studied previously, we assume that in this general system, files with access probability zero are never requested, hence we do not care about the value of f(0). As an example, we will next examine the case when $$f(q) = \frac{\lambda}{q}.$$

Studies have shown that a small percentage of the files available on a given server usually account for a large portion of accesses to the server [3, 4]. This implies that, in general, a small number of files in the system have large access probabilities, while most of the files have small access probabilities. To model this, we choose a simple function for f(q), namely we assume that the rate at which files with access probability q appear in the system is given by $$f(q) = \frac{\lambda}{q},$$

where $q \in (0,1]$ and $\lambda$ is the arrival rate of the user requests.

In this example system, if we set the prefetch threshold as $H(0<H\leq 1)$ and prefetch all the files with access probability greater than or equal to H, then $$\lambda = \int_H^1 \frac{\lambda}{q} dq = -\lambda \ln(H).$$

Among them, $$\int_H^1 q \frac{\lambda}{q} dq = (1-H)\lambda$$

are eventually used on average, hence $\lambda = H\lambda$. Similar to our previous analysis, we compute the average cost of each user request as $$C = \frac{\lambda_1 c_1 + \lambda_2 c_2}{\lambda} = \alpha_B s[H - \ln(H)] + \frac{\alpha_T \cdot s \cdot H}{b - [H - \ln(H)]\lambda} \quad (16)$$

Figure 7:
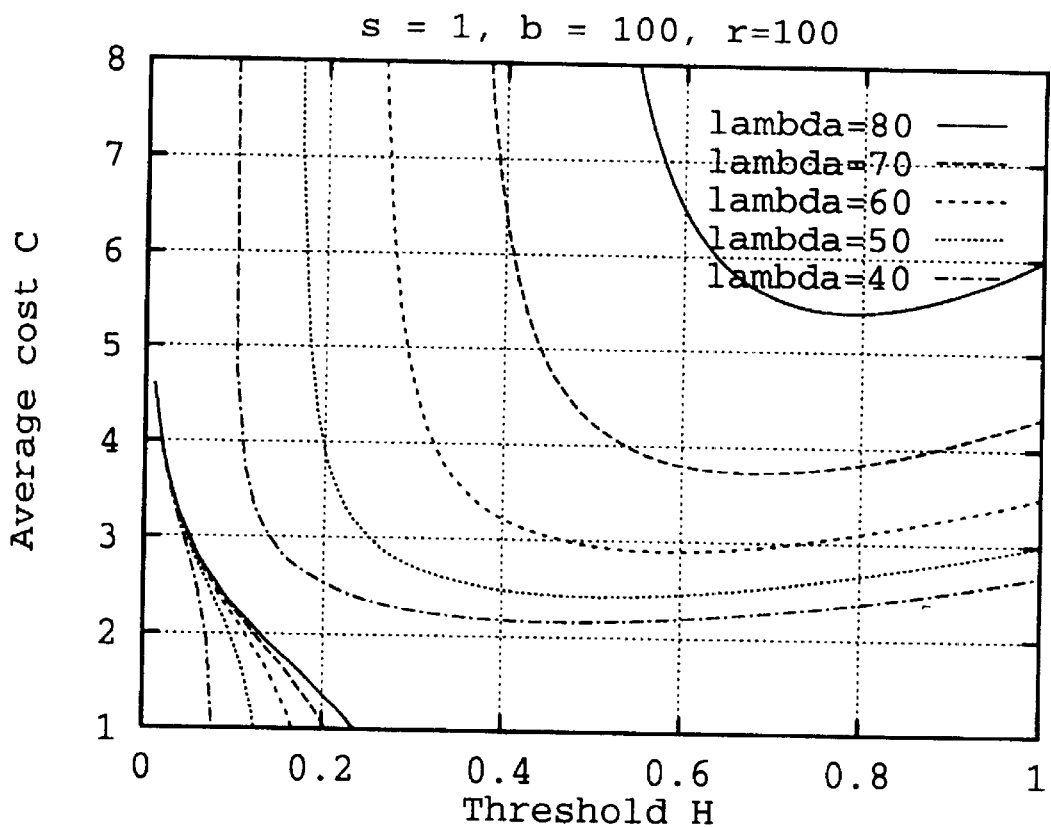
FIG. 7 shows a plot of average cost C as a function of prefetch threshold H.

Equation (16) is plotted in FIG. 7 as a function of the prefetch threshold H for different values of user request arrival rate $\lambda$. Taking the derivative of equation (16) with respect to H yields $$\frac{dC}{dH} = \alpha_B \cdot s \left(1 - \frac{1}{H}\right) + \frac{\alpha_T \cdot s}{b - [H - \ln(H)]\lambda} + \frac{p \cdot \alpha_T \cdot s \cdot \lambda(1 - 1/H)}{[b - [H - \ln(H)]\lambda]^2}$$

FIG. 7 shows that the cost is minimized at $$\frac{dC}{dH} = 0.$$

Figure 8:
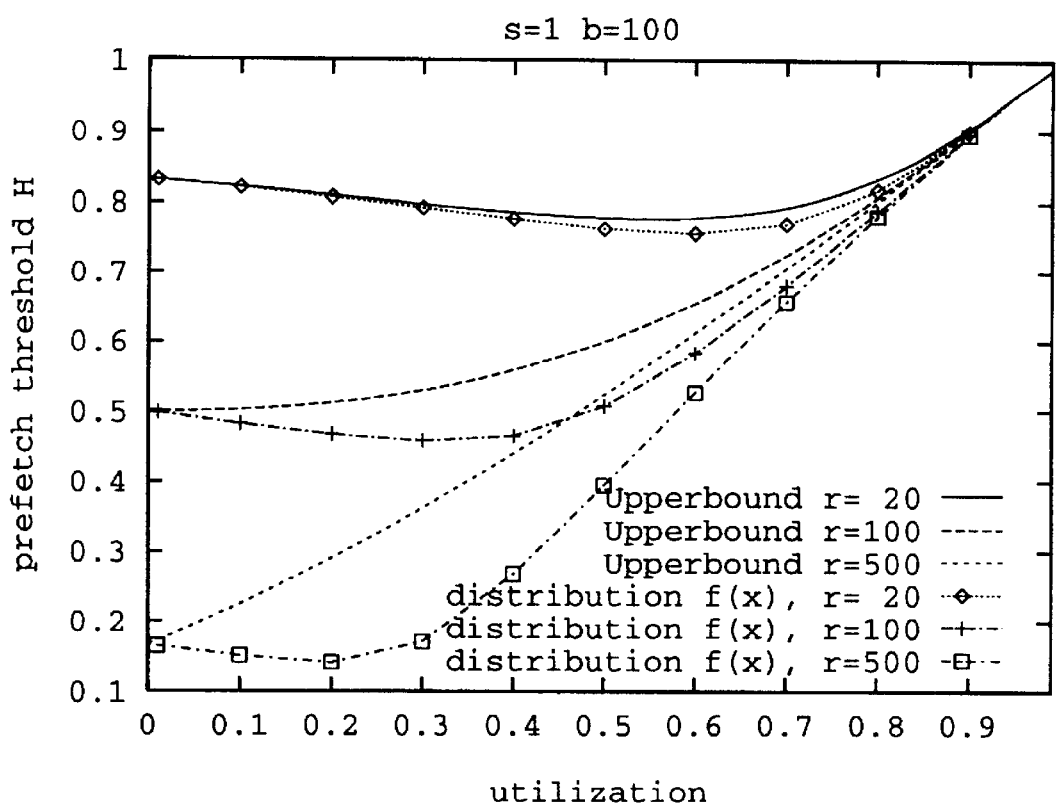
FIG. 8 shows a plot of prefetch threshold upper bound and the prefetch threshold versus system utilization

Let us evaluate $$\frac{dC}{dH} = 0$$

for several system loads and $$\frac{\alpha_T}{\alpha_B}$$

to determine the optimum value of H in each case such that the cost is minimized. The results are compared with the upper bound obtained using (15) in FIG. 8, where the upper bounds are shown as smooth lines and the results for $$f(q) = \frac{\lambda}{q}$$

are shown as points connected with lines.

e) The Prefetch Threshold for the System with Nonzero Start Up Delay

So far, we have been studying the system with zero startup time. For the system with a startup time $t_0$ greater than zero, we can prove in a similar way that the prefetch threshold should be set to the following $$H = 1 - \frac{(1-\rho)\left(1 + \frac{s_0}{s}\right)\frac{\alpha_T}{\alpha_B}}{(1-\rho)^2 b + \left(1 + \frac{s_0}{s}\right)\frac{\alpha_T}{\alpha_B}} \quad (17)$$

where $$s_0 = t_0 \cdot b(1-\rho).$$

In summary, the prefetch threshold module works in the following way. For given $\lambda$ and $$\frac{\alpha_T}{\alpha_B},$$

and a file with access probability $p_i > 0$, compute H using equation (17). The file is prefetched if and only if $p_i$ is greater than or equal to the H obtained.

f) The Prefetch Threshold for More General Systems.

Up to now, we have been assuming that all users in the system have the same $\alpha_T$ and $\alpha_B$. In the real world, people value their time differently; therefore, $\alpha_T$ can vary from user to user. Since generally the same network carrier company supports users who are sharing the same network, we can assume that $\alpha_B$ is the same throughout the system. In addition, after some users have started prefetching files, others can't use (15) to determine the prefetch thresholds. This is because the distribution of access probabilities in the system is very complex, and a user may be unable to find the user request rate $\lambda$ from the current $\lambda_1$ and $\lambda_2$. In the following, we study the system with users who have different $\alpha_T$'s and in which some users have already started prefetching files. Again, we assume the startup time is zero.

Assume there are n users in the system and the cost of a time unit for user i is $\alpha_{T_i}$. In addition, we assume that user i issues requests at rate $\lambda_i$. Accordingly, the rate of normal requests from user i is $\lambda_{i_1}$, and the rate of prefetch requests from the same user's prefetch program is $\lambda_{i_2}$ where $\lambda_{i_2}$ could be zero. We further assume that the arrival of requests to the server is a Poisson process. As in the previous system, the cost of a user request is the sum of the system resource cost and the time cost, and is given by $$C = \frac{s}{\sum_{i=1}^{n} \lambda_i} \left[ \sum_{i=1}^{n} (\lambda_{i_1} + \lambda_{i_2})\alpha_B + \frac{\sum_{i=1}^{n} \lambda_i \alpha_{T_i}}{b - \sum_{i=1}^{n} (\lambda_{i_1} + \lambda_{i_2})s} \right] \quad (18)$$

Assume that for each user in the system except user k, the current prefetch request rate $\lambda_{i_2}$ is known, and $\lambda_{k_2}=0$. We want to determine the prefetch threshold for user k, $H_k$, such that the cost C decreases if user k prefetches the files with access probabilities greater than or equal to $H_k$. Similar to the method we used above, we take the derivative of the cost function twice. For the case where $$\frac{\partial^2 C}{\partial^2 \lambda_{k_2}} < 0$$

for all possible values of $\lambda_{k_2}$, we find the critical $\lambda'_{k_2}$ which makes $$\frac{\partial^2 C}{\partial^2 \lambda_{k_2}} = 0.$$

When $\lambda'_{k_2} < 0$, we can compute the prefetch threshold $H_k$, which is given by $$H_k = 1 - \frac{\alpha_{T_k}\left[b - \left(\lambda_k + \sum_{i \neq k}^{n}(\lambda_{i_1} + \lambda_{i_2})s\right)\right]}{\alpha_B\left[b - \left(\lambda_k + \sum_{i \neq k}^{n}(\lambda_{i_1} + \lambda_{i_2})s\right)\right]^2 + s\sum_{i \neq k}^{n}\lambda_{i_1}\alpha_{T_i} + \alpha_{T_k}\left[b - \sum_{i \neq k}^{n}(\lambda_{i_1} + \lambda_{i_2})s\right]}. \quad (19)$$

Since user k has not prefetched any file, we have that $\lambda_{k_1} = \lambda_k$ and $$\frac{\sum_{1}^{n}(\lambda_{i_1} + \lambda_{i_2})}{b} = \rho,$$

and then (19) is equivalent to $$H_k = 1 - \frac{\alpha_{T_k}\left[b - \sum_{i=1}^{n}(\lambda_{i_1} + \lambda_{i_2})s\right]}{\alpha_B\left[b - \sum_{i=1}^{n}(\lambda_{i_1} + \lambda_{i_2})s\right]^2 + s\sum_{i \neq k}^{n}\lambda_{i_1}\alpha_{T_i} + \alpha_{T_k}\left[b - \sum_{i=1}^{n}(\lambda_{i_1} + \lambda_{i_2})s\right]}$$

$$= 1 - \frac{(1-\rho)\frac{\alpha_{T_k}}{\alpha_B}}{(1-\rho)^2 b + (1-\rho)\frac{\alpha_{T_k}}{\alpha_B} + \frac{s}{b\alpha_B}\sum_{i \neq k}^{n}\lambda_{i_1}\alpha_{T_i}} \quad (20)$$

Similar to the proof for the previous system, we can show that for fixed $\lambda_{i_2}$, ($1 \leq i \leq n, i \neq k$), if user k prefetches all the files with access probability greater than $H_k$, the cost C is minimized. As the system changes, each user recomputes his prefetch threshold using (20) based on the new network conditions. In this way, the prefetch thresholds adapt to a changing environment. This algorithm is greedy in nature. And if the system is stable, it can achieve its locally optimal state.

Experimental Results

Up to this point we have explained the algorithms behind the operation of our invention. We have presented a prediction algorithm for web browsing that can be used on both the server and client. It is important to understand how the access probabilities from the server and client should be used, and how this use affects the system performance. Now, we show the experimental results obtained from the UCLA (University of California Los Angeles Computer Science (CS) department web server's log file taken during the period from April 11th to June 5th of 1996. The log consists of more than 300,000 actual user accesses. In the experiments, we concentrated on two representative pages: the CS department home page and the home page for TAs (teaching assistants). More precisely, only when one of these two pages was being viewed, was the prediction algorithm activated and the program used to prefetch files linked to the page. And only when a file linked to one of these two pages was requested, did the program check if it had been prefetched. The CS department home page contains links to research, students, faculty, and other general information home pages. These links are not updated very often. The TA home page has links to all the class home pages, which are updated frequently to include new assignments, handouts, etc. Therefore, simulations on these two pages indicate how well our prediction algorithm works on pages that are revisited frequently by some particular users and on other pages that are generally not revisited frequently. To study how the access probabilities from the server and the client affect the performance of prediction, we tested three cases. 1) Using only the access probabilities from the client site. 2) Using only the access probabilities from the server site. 3) Merging the access probabilities from server and client as designed in our original algorithm. Namely, assume A is the current page; if $C_A<5\$$, then use the access probabilities from the server for the links on page A, otherwise use the access probabilities from the client. A fixed prefetch threshold was used in each experimental run and varied for different runs. All the files with access probability greater than or equal to the prefetch threshold were prefetched. We measured several different system parameters. If the user requested a page, and the request was satisfied by a prefetched copy of the file, we scored the result as a hit. The hit rate is defined as the ratio of the number of hits over the total number of user requests. For a fixed number of user requests, the higher the hit rate, the more time is saved by prefetching. The successful prediction rate is the probability of a prefetched file being eventually used. A high successful prediction rate indicates that less bandwidth is wasted due to prefetching unused files. FIGS. 9–12 show the successful prediction rate and hit rate obtained for the pages linked to the CS home page and the TA home page respectively with prefetch thresholds between 0.01–0.9 for the three cases described above.

Figure 9:
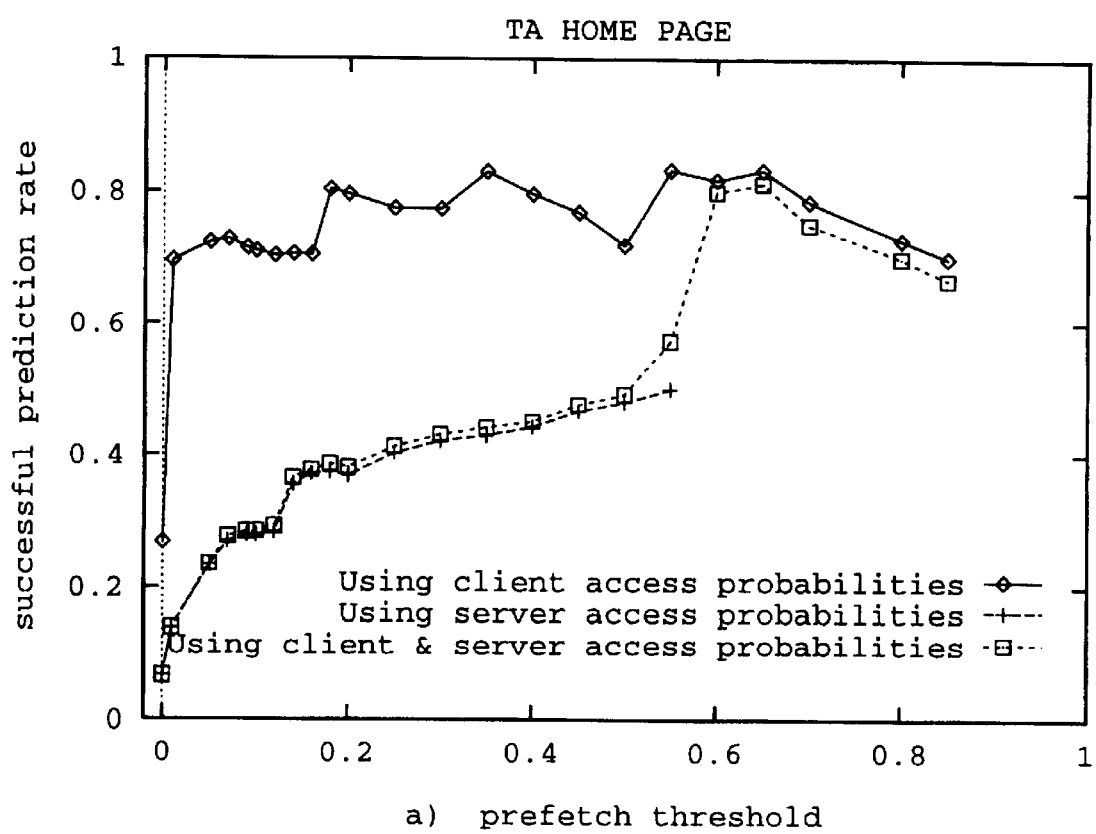
FIG. 9 shows a plot of successful prediction rate using a prefetch threshold algorithm on a teaching assistant (frequently updated) page.
Figure 10:
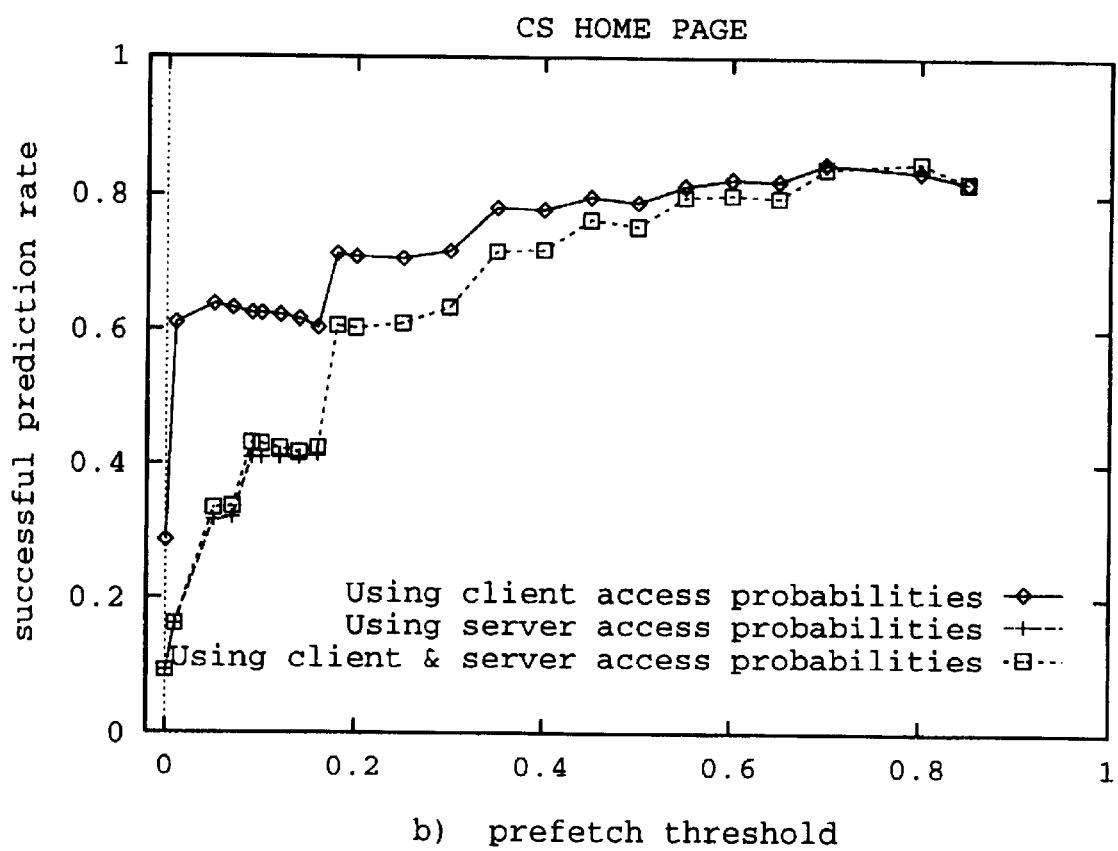
FIG. 10 shows a plot of successful prediction rate using a prefetch threshold algorithm on a university department (slowly updated) page.

As shown in FIGS. 9 and 10 for both home pages, using only access probabilities on the client site yields. successful prediction rates of around 70% when the threshold is just slightly higher than zero. As the threshold increases, the successful prediction rate tends to increase. In FIG. 9, the tails of the top two curves drop because there were very few files prefetched at those threshold values, and the sample size was very small. Each curve ends at the point where no file is prefetched for larger prefetch thresholds. Although the successful prediction rates are lower when the access probabilities from the server were used, the result is good given that these probabilities are based on the accesses from hundreds of other clients who are totally unrelated to the user. Without the access probabilities from the server, no prefetch is possible when the. user visits a page for the first few times. This is further supported by the hit rate distribution shown in FIGS. 11 and 12.

Figure 11:
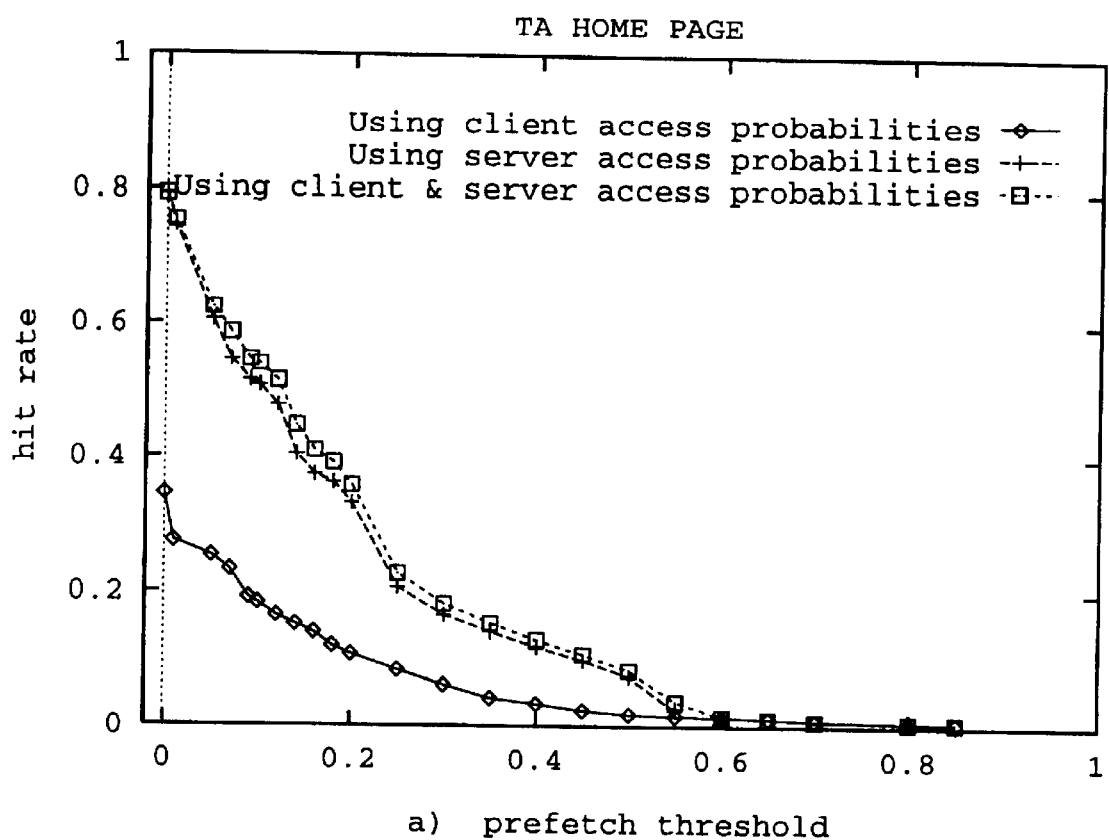
FIG. 11 shows a plot of hit rate versus prefetch threshold on the teaching assistant page.
Figure 12:
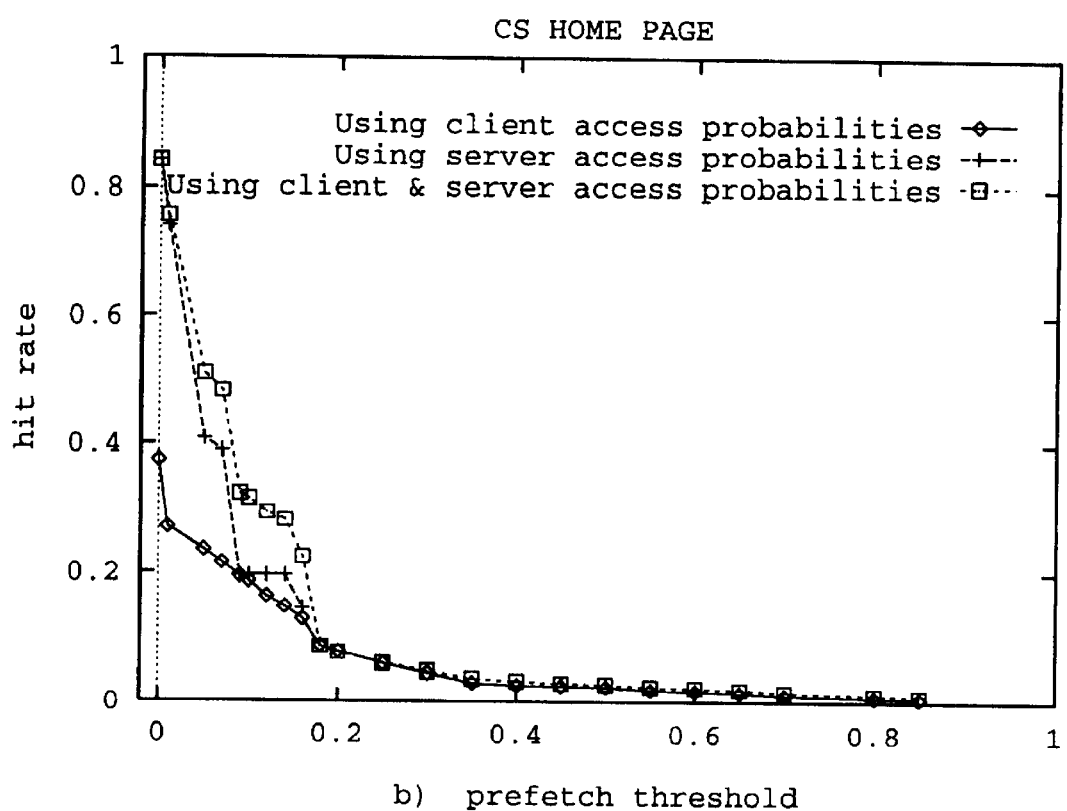
FIG. 12 shows a plot of hit rate versus prefetch threshold on the university department page.

From FIGS. 11 and 12 we can see that, if the prediction algorithm is run only on the client site, the hit rate is not as good as the successful prediction rate. The reason for this is, in many cases, the user had not visited a page enough times and no file was prefetched from the page. On the other hand, by using only access probabilities from the server or merging those from server and client, we obtain much higher hit rates. In addition, for small prefetch thresholds, these two curves are very close because prefetches invoked due to high access probabilities at the client site only contribute a small portion of the total number of prefetches.

In FIGS. 11 and 12, the hit rate of the pages linked to TA home page is lower than 40% when the prefetch threshold is zero. This is because, although the TA home page is the main place where requests to class home pages are generated, some students access a class home page using bookmarks or from pages other than the TA home page, such as the instructor's home page. In those cases no prefetch was performed in our experiment since we did not apply the prefetch algorithm to pages other than the TA and CS home pages. The same problem exists for pages linked to the CS home page but is less significant. For the same reason, the hit rate in a real system should be higher than what is shown in FIGS. 11 and 12.

Figure 13:
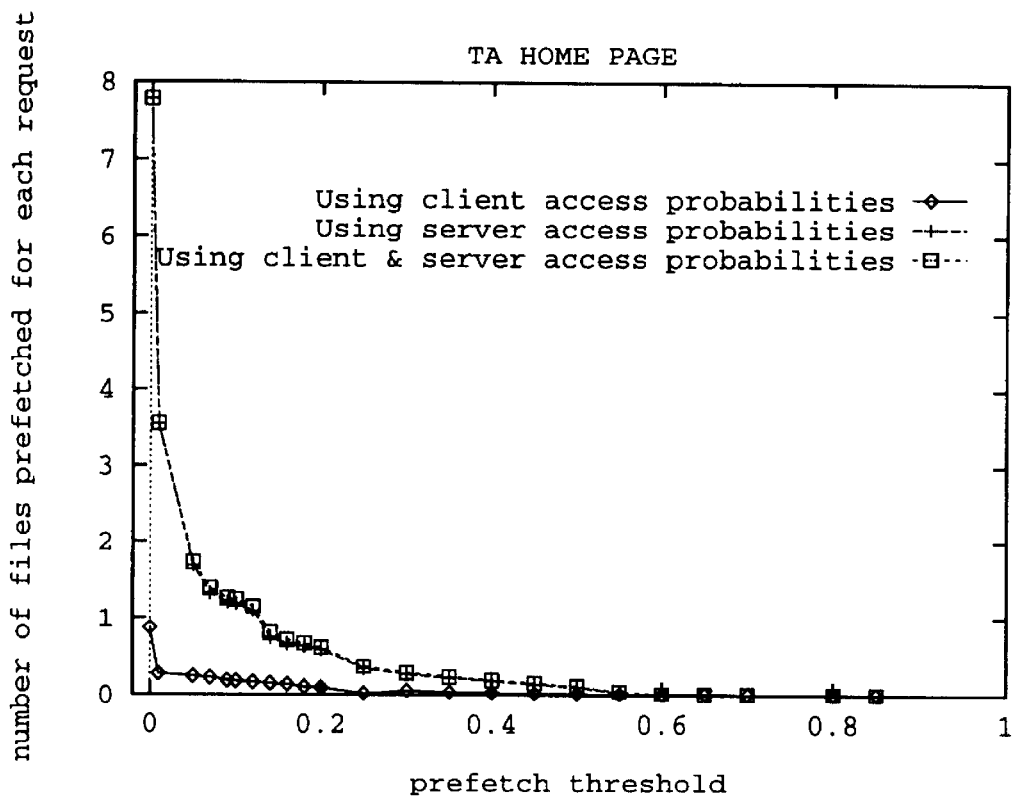
FIG. 13 shows a plot of the average number of files prefetched for each user request on the teaching assistant page.
Figure 14:
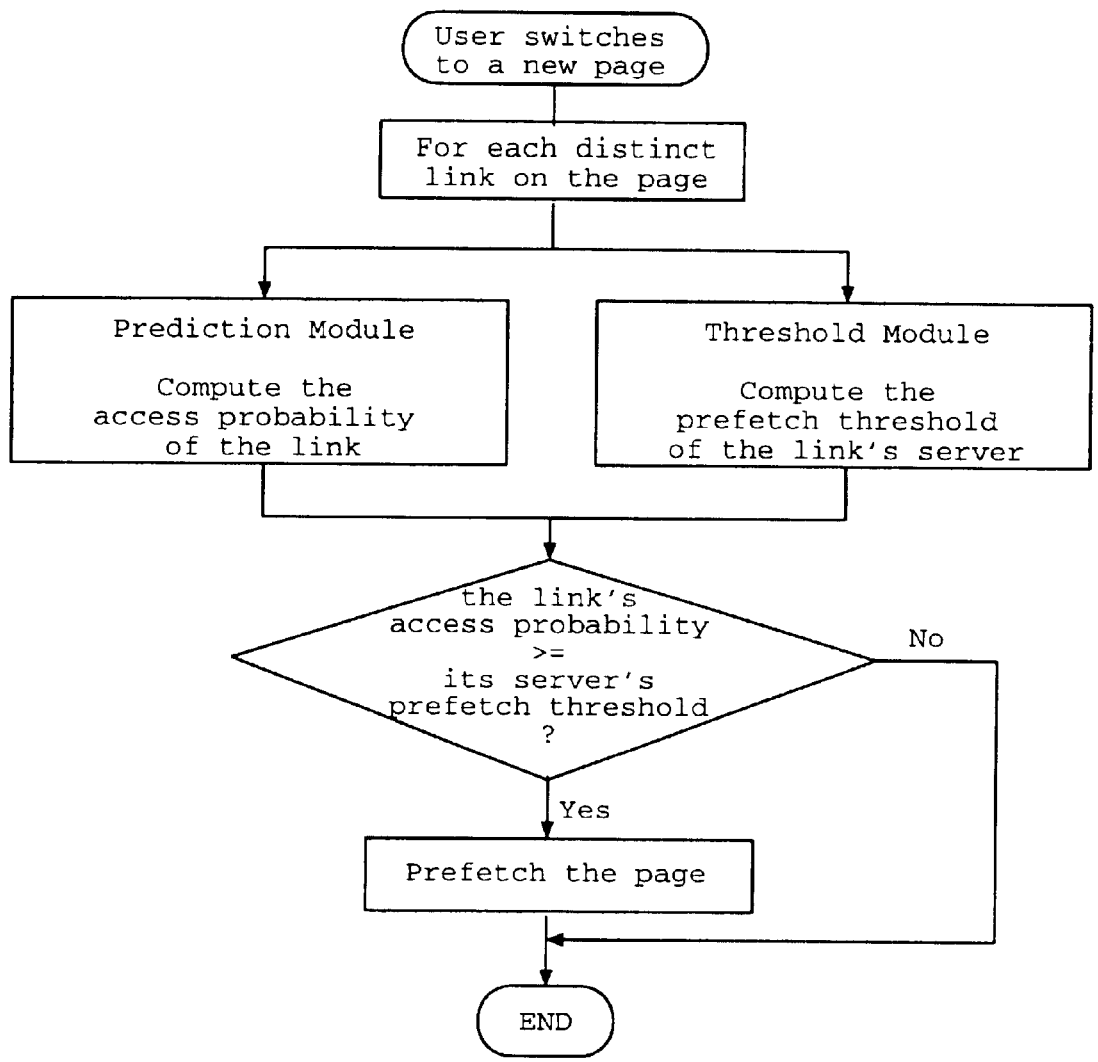
FIG. 14 shows a simple flow diagram of the operation of the present invention.

FIG. 13 shows the relation between the prefetch threshold and the average number of files prefetched for each user request, which indicates the amount of traffic increase in the entire system due to prefetching. When only the access probabilities from the client was used, this average number is very low, since the prediction was very accurate, and if the user had not visited the page at least 5 times, no link on it was prefetched. More files were prefetched for the other two cases, but still the average number of files prefetched for each user request is low. Comparing FIGS. 11 and 12 with FIG. 13, we can see that for a hit rate of more than 60%, the average number of files prefetched for each user request is less than two.

Implementation—a Prefetch Program

We have developed a program on PC Windows® system based on the real time prefetch scheme described in the last few sections. The program is integrated with the Netscape® browser through the Netscape® Client API (Application Programming Interface). When executed on a PC for the first time, it needs to register with the machine's Netscape® program as an http protocol handler. After that, each time the browser is opened, the prefetch program is started automatically. When the prefetch function is activated, the user may use the browser as usual. The Netscape® window looks the same, except that some icons will be added to the page being viewed to alert the user regarding the status of the links on that page. (see below)

In our program, whenever a new page is displayed, the status of each link on this page is checked by measuring the sum of the time needed to connect to the server and the time between sending out a header request and receiving the response from the server. The value obtained in this way is not very accurate and may vary with time. However, in general, it does indicate the quality of the link at that time.

Figure 15:
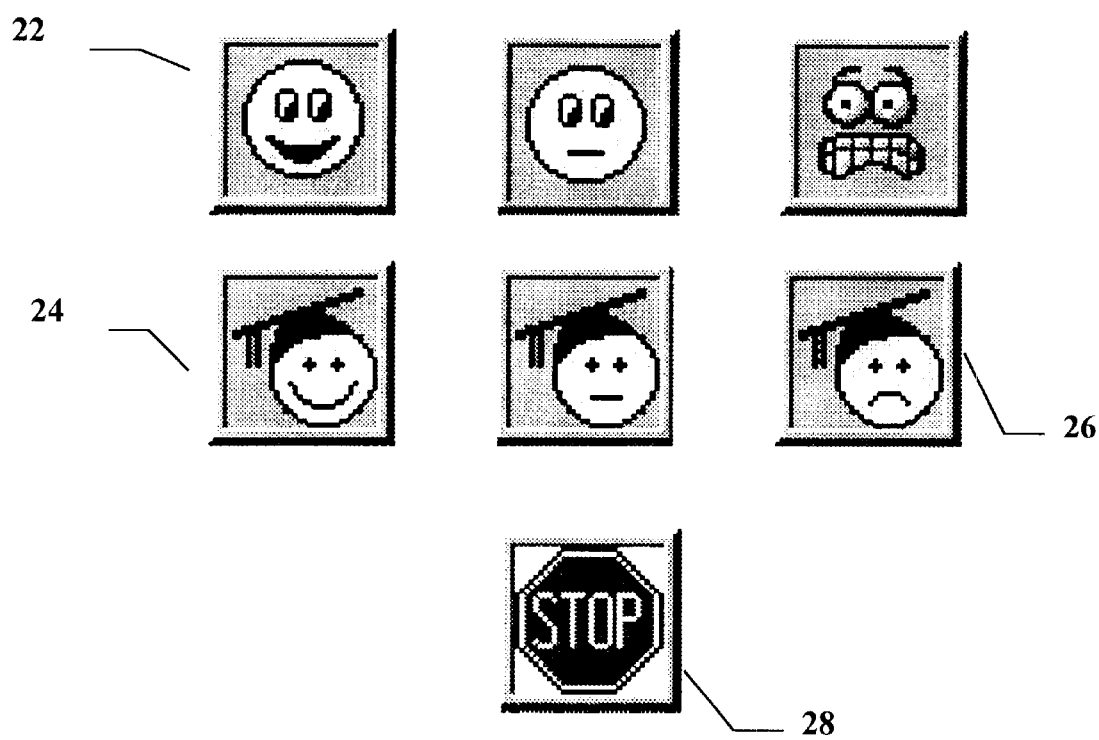
FIG. 15 shows icons used in the prefetch program with a web browser.

If the user has downloaded some pages from the server recently, say in the last ten minutes, the average speed at which the files were downloaded is a better estimation of the actual link condition [1]. This link quality information is provided to the user through an icon placed next to the corresponding link. This can potentially reduce traffic on congested links, because most people would choose a faster link if several options are available. FIG. 15 shows the icons currently used in our program.

Figure 16:
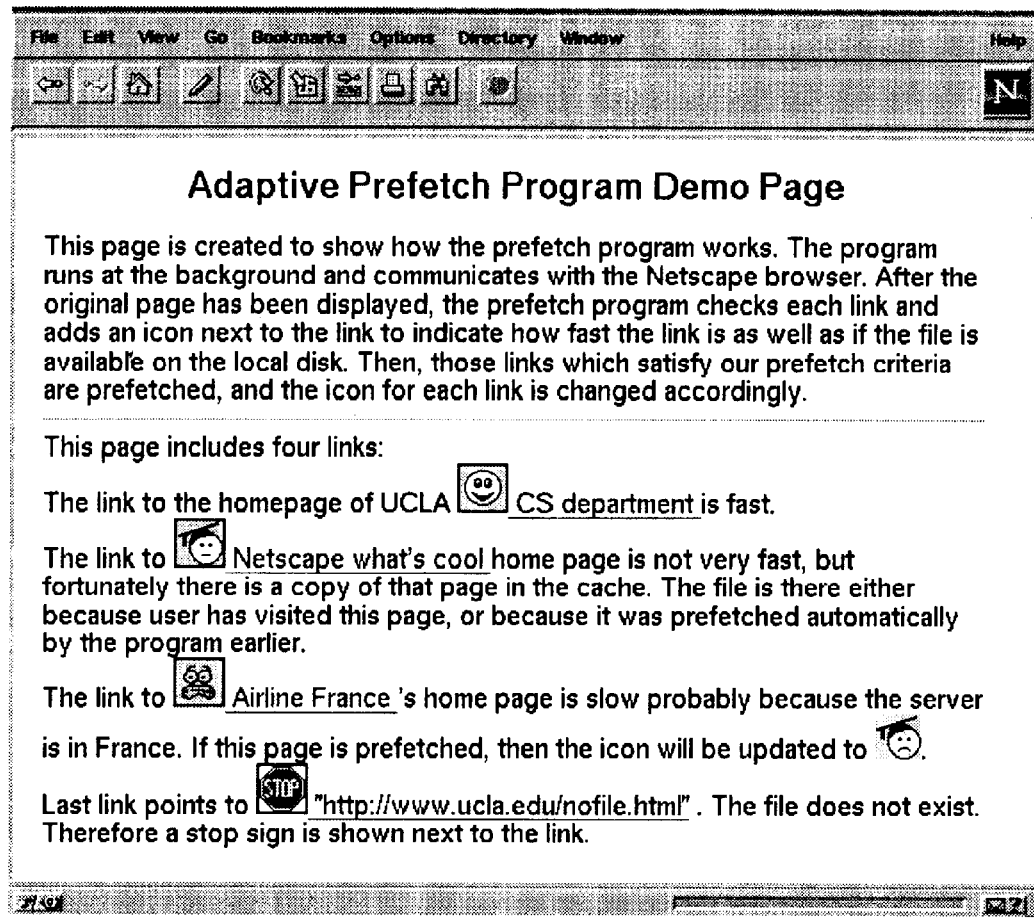
FIG. 16 shows a sample page to demonstrate the use of the icons.

Basically, the mouth shape of an icon indicates whether a link is fast, slow, or in-between, and the hat indicates if a copy of the file is cached on the local computer. For example, the first icon 22 in FIG. 15 has a "smiley" face indicating that the connection is good. Requests to this server are expected to be satisfied very fast. The icon 24 below it shows not only that the link is fast, but also that the file is available on the local disk (presence of the hat). The last icon 26 in the second row indicates that the file is cached on the local disk, but it may be slow if you follow that link further to access other pages on that server. The icon 28 at the bottom indicates an error, for example the server is not reachable or the file was not found. After a file is prefetched, the icon next to the corresponding link will be switched to a face wearing a hat with the same mouth shape. FIG. 16 is a sample screen which demonstrates how the icons work.

One interesting thing we found from using this program is that the user tends to go to pages that have been prefetched, even though they would not have been interested in them had these pages not been prefetched. This is because prefetched files are fast to load, which means it does not take the user much time in case the page is not interesting. Moreover, if prefetching is carried out based on access probabilities from the server, then the user may read them out of curiosity, since prefetched pages are presumably popular among other users according to our prediction algorithm.

Many alterations and modifications may be made by those having ordinary skill in the art without departing from the spirit and scope of the present invention. The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself. The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope and spirit of the invention. The illustrated embodiment has been set forth only for the purposes of example and that should not be taken as limiting the invention. Therefore, it is to be understood that, within the scope of the appended claims, the invention may be practiced other than as specifically described herein.

APPENDIX A

This appendix constitutes a proof of Theorem 1.

Theorem 1

Consider a system in which b, s, and $\lambda$ and $$\frac{\alpha_T}{\alpha_B}$$

are known. Let f(q) be the rate at which files with access probability q appear in the system, where $$\int_0^1 qf(q)dq = \lambda$$

and $0 < q \leq 1$. Expression (15), $$H = 1 - \frac{(1-\rho)\frac{\alpha_T}{\alpha_B}}{(1-\rho)^2 b + \frac{\alpha_T}{\alpha_B}}$$

is an upper bound for the optimum prefetch threshold of this system.

Proof: We assume f(q) is continuous. The proof is similar for f(q) discrete. Since f(q) is the rate at which files with access probability q appear in the system, for any $h(0<h\leq 1)$, if all and only those files with access probability greater than or equal to h are prefetched, then the arrival rate of the prefetch requests is $$\lambda_2 = \int_h^1 f(q)dq \quad (21)$$

hence, the normal requests arrive with rate $$\lambda_1 = \lambda = \int_h^1 f(q)dq \quad (22)$$

When the prefetch request rate is $\lambda_2$, the average cost of each user request is given by $$C(\lambda_2) = \frac{\lambda_1 c_1 + \lambda_2 c_2}{\lambda} \quad (23)$$

where, the same as in our previous analysis, $$c_1 = \alpha_B \cdot s + \alpha_T \cdot \frac{s}{b - (\lambda_1 - \lambda_2) \cdot s}$$

$$c_2 = \alpha_B \cdot s$$

Assume that, by plugging b,s,$\lambda$, and $$\frac{\alpha_T}{\alpha_B}$$

into (15), we obtain a value H'. Now we consider another system with the same b,s,$\lambda$, and $$\frac{\alpha_T}{\alpha_B}.$$

When the user is using a file, for each file in the new system, we set its access probability to H' if and only if it is at least H' when the same file is being used in the original system, otherwise we set the probability to 0. Since two system have the same b,s,λ, and $$\frac{\alpha_T}{\alpha_B},$$

the prefetch threshold for the new system is H' by (15). This implies that the average cost of a user request can be minimized by prefetching all the files with access probability H'. In this new system, let $\overline{\lambda}_2$ be the corresponding prefetch request rate at which the cost is minimized. By our definition of the new system and the results above, the result is given by $$\overline{\lambda}_2 = \int_H^1 f(q) dq$$

Let $C_{new}(\lambda_2)$ be the average cost of viewing a page when the prefetch rate is $\lambda_2$. The analysis section above shows that $$\frac{dC_{new}(\lambda_2)}{d\lambda_2} = \frac{s}{\lambda}\left[(1 - H')\alpha_B + \frac{\alpha_T(\lambda s - H'b)}{[b - (\lambda_1 + \lambda_2)s]^2}\right] \leq 0 \quad (24)$$

Based on equations (21) and (22), we take the derivative of equation (23) with respect to $\lambda_2$ to obtain $$\frac{dC(\lambda_2)}{d\lambda_2} = \frac{s}{\lambda}\left[(1 - h)\alpha_B + \frac{\alpha_T[(\lambda_2 h + \lambda_1)s - hb]}{[b - (\lambda_1 + \lambda_2)s]^2}\right] \quad (25)$$

Comparing equation (24) and (25) term wise yields the results $$\frac{dC(\lambda_2)}{d\lambda_2} \leq \frac{dC_{new}(\lambda_2)}{d\lambda_2} \leq 0$$

for $0 \leq \lambda_2 \leq \overline{\lambda}_2$.

Since for $0 \leq \lambda_2 \leq \overline{\lambda}_2$, H'≦h≦1. This implies that for H'≦h≦1 the average cost of viewing a file decreases as h decreases. Therefore the prefetch threshold which is going to minimize the cost in the original system must be less than or equal to H'. In other words, H' obtained from (15) is the upper bound of the prefetch thresholds for the general systems with the same b,s,λ, and $$\frac{\alpha_T}{\alpha_B}.$$

REFERENCES CITED

[1] H. Balakrishnan, S. Seshan, M. Stemm, and R. H. Katz "Analyzing Stability in Wide-Area Network Performance," *Proceedings of ACM SIGMETRICS Conference on Measurement & Modeling of Computer Systems*, Seattle, Wash., USA, June 1997.

[2] A. Bestavros, "Speculative Data Dissemination and Service to Reduce Server Load, Network Traffic and Service Time for Distributed Information Systems," *Proceedings of ICDE'96: The 1996 International Conference on Data Engineering*, New Orleans, La., March 1996.

[3] A. Bestavros, "WWW Traffic Reduction and Load Balancing Through Server-Based Caching," *IEEE Concurrency: Special Issue on Parallel and Distributed Technology*, vol. 5, January–March 1997, pp. 56–67.

[4] J. S Gwertzman, "Autonomous Replication Across Wide-area Internetworks," Thesis, Harvard College, Cambridge, Mass., 1995.

[5] L. Kleinrock, *Queueing Systems Vol 1: Theory*, John Wiley & Sons, New York, N.Y., 1975.

[6] L. Kleinrock, *Queueing Systems Vol 2: Computer Applications*, John Wiley & Sons, New York, N.Y., 1975.

[7] E. Markatos, C. Chronaki, "A Top-10 Approach to Prefetching on the Web," Technical Report 173, ICS-FORTH, http://www.ics.forth.gr/proj/arch-vlsi/www.html, August 1996.

[8] V. N. Padmanabhan, J. C. Mogul, "Using Predictive Prefetching to Improve World Wide Web Latency," *Computer Communication Review*, July 1996, pp. 22–36.

[9] *PeakJet Software Homepage*, http://www.peakmedia.com/PeakJet/PeakJet.html.

What is claimed is:

1. A method for reducing latency of requests by a local computer for computer files available from a network computer by prefetching a subset of available computer files to the local computer comprising the steps of:

calculating an access probability for each computer file available to the local computer wherein the access probability of a file is an estimate of the probability with which the file will be requested by the local computer and wherein calculating the access probability employs an application specific algorithm based on access history at the local computer, or network computer, or both;

calculating a prefetch threshold, based on current network conditions for each computer network server containing at least one file with nonzero access probability and wherein calculating a prefetch threshold employs an algorithm that is not application specific, but is a function of system load, capacity, and cost of a time unit and a system resource unit to a user; and accessing each file whose access probability exceeds or equals it's server's prefetch threshold if there is no current copy of the file already on the local computer.

2. The method of claim 1, wherein the step of calculating an access probability employs an algorithm particularly suited to a web browsing application and wherein a computer file is considered as being available only if the computer file is directly linked to a page be displayed by the local computer.

3. A method for reducing latency of requests by a local computer for computer files available from a computer network by prefetching a subset of available computer files to the local computer comprising the steps of:

determining an access probability for each computer file available to the local computer wherein the access probability of a file is an estimate of the probability with which the file will be requested by the local computer and wherein determining the access probability employs an application specific algorithm;

determining a prefetch threshold, based on current network conditions for each computer network server containing at least one file with nonzero access probability wherein determining a prefetch threshold employs an algorithm that is not application specific; and prefetching each file whose access probability exceeds or equals it's server's prefetch threshold if there is no current copy of the file already on the local computer;

wherein the step of determining an access probability employs an algorithm particularly suited to a web browsing application and wherein a computer file is considered as being available only if the computer file is directly linked to a page being currently displayed by the local computer, further comprising the steps of:
  maintaining a page counter $C_A$ for each page A;
  determining if a link to a page B exists from page A and maintaining a link counter $C_{(A,B)}$ for the pair if the link exists;
  incrementing $C_A$ whenever page A is downloaded;
  incrementing $C_{(A,B)}$ whenever page B is accessed by means of the link; and
  determining the access probability $\rho$ of a page $B_i$ linked to the page A being displayed by the local computer according to $$p(Bi|A) = \min\left(1, \frac{C_{(A,B_i)}}{C_A}\right)$$

for $C_A \geq 5$, and 0 for $C_A < 5$.

4. A method for reducing latency of requests by a local computer for computer files available from a computer network by prefetching a subset of available computer files to the local computer comprising the steps of:

determining an access probability for each computer file available to the local computer wherein the access probability of a file is an estimate of the probability with which the file will be requested by the local computer and wherein determining the access probability employs an application specific algorithm;

determining a prefetch threshold, based on current network conditions for each computer network server containing at least one file with nonzero access probability wherein determining a prefetch threshold employs an algorithm that is not application specific; and prefetching each file whose access probability exceeds or equals it's server's prefetch threshold if there is no current copy of the file already on the local computer;

wherein the prefetch threshold is determined using an equation where $\alpha_T$ represents a delay cost, $\alpha_B$ represents a system resource cost, b represents capacity of a pathway for conducting a prefetched file to the local computer, $\rho$ represents an overall load of the computer network, and where the equation is given by $$H = 1 - \frac{(1-\rho)\frac{\alpha_T}{\alpha_B}}{(1-\rho)^2 b + \frac{\alpha_T}{\alpha_B}}.$$

5. A method for reducing latency of requests by a local computer for computer files available from a computer network by prefetching a subset of available computer files to the local computer comprising the steps of:

determining an access probability for each computer file available to the local computer wherein the access probability of a file is an estimate of the probability with which the file will be requested by the local computer and wherein determining the access probability employs an application specific algorithm;

determining a prefetch threshold, based on current network conditions for each computer network server containing at least one file with nonzero access probability wherein determining a prefetch threshold employs an algorithm that is not application specific; and prefetching each file whose access probability exceeds or equals it's server's prefetch threshold if there is no current copy of the file already on the local computer;

wherein the prefetch threshold is determined using an equation where $\alpha_T$ represents a delay cost, $\alpha_B$ represents a system resource cost, b represents capacity of a pathway for conducting a prefetched file to the local computer, $\rho$ represents an overall load of the computer network, s represents a size of the prefetched file and where the equation is given by $$H = 1 - \frac{(1-\rho)\left(1+\frac{s_0}{s}\right)\frac{\alpha_T}{\alpha_B}}{(1-\rho)^2 b + \left(1+\frac{s_0}{s}\right)\frac{\alpha_T}{\alpha_B}}.$$

6. A method for reducing latency of requests by a local computer for computer files available from a computer network by prefetching a subset of available computer files to the local computer comprising the steps of:

determining an access probability for each computer file available to the local computer wherein the access probability of a file is an estimate of the probability with which the file will be requested by the local computer and wherein determining the access probability employs an application specific algorithm;

determining a prefetch threshold, based on current network conditions for each computer network server containing at least one file with nonzero access probability wherein determining a prefetch threshold employs an algorithm that is not application specific; and prefetching each file whose access probability exceeds or equals it's server's prefetch threshold if there is no current copy of the file already on the local computer;

wherein the prefetch threshold $H_k$ for a user k is determined using an equation where $\alpha_T$ represents a delay cost, $\alpha_B$ represents a system resource cost, b represents capacity of a pathway for conducting a prefetched file to the local computer, $\rho$ represents an overall load of the computer network, s represents a size of the prefetched file, and $\lambda$ represents a file request rate and where the equation is given by $$H_k = 1 - \frac{\alpha_{T_k}\left[b - \sum_{i=1}^n (\lambda_{i_1}+\lambda_{i_2})s\right]}{\alpha_B\left[b - \sum_{i=1}^n (\lambda_{i_1}+\lambda_{i_2})s\right]^2 + s\sum_{i=k}^n \lambda_{i_1}\alpha_{T_i} + \alpha_{T_k}\left[b - \sum_{i=1}^n (\lambda_{i_1}+\lambda_{i_2})s\right]}$$

$$= 1 - \frac{(1-\rho)\frac{\alpha_{T_k}}{\alpha_B}}{(1-\rho)^2 b + (1-\rho)\frac{\alpha_{T_k}}{\alpha_B} + \frac{s}{b\alpha_B}\sum_{i=k}^n \lambda_{i_1}\alpha_{T_i}}.$$

7. An apparatus for reducing latency of requests by a local computer for computer files available from a computer network by prefetching a subset of available computer files to the local computer comprising:

means for calculating an access probability for each computer file available to the local computer wherein the access probability of a file is an estimate of the probability with which the file will be requested by the local computer and, wherein calculating the access probability employs an application specific algorithm based on access history at the local computer, or network computer, or both;

means for calculating a prefetch threshold, based on current network conditions for, each computer network server containing at least one file with nonzero access probability wherein calculating a prefetch threshold employs an algorithm that is not application specific, but is a function of system load, capacity, and cost of a time unit and a, system resource unit to a user; and means for prefetching each file whose access probability exceeds or equals it's server's prefetch threshold if there is no current copy of the file already on the local computer.

8. The apparatus of claim 7, wherein the means for calculating an access probability employs an algorithm particularly suited to a web browsing application and wherein a file is considered as being available only if the file is directly linked to a page being currently displayed by the local computer.

9. An apparatus for reducing latency of requests by a local computer for computer files available from a computer network by prefetching a subset of available computer files to the local computer comprising:

means for determining an access probability for each computer file available to the local computer wherein the access probability of a file is an estimate of the probability with which the file, will be requested by the local computer and wherein determining the access probability employs an application specific algorithm;

means for determining a prefetch threshold, based on current network conditions for each computer network server containing at least one file with nonzero access probability wherein determining a prefetch threshold employs an algorithm that is not application specific; and means for prefetching each file whose access probability exceeds or equals it's server's prefetch threshold if there is no current copy of the file already on the local computer, wherein the means for determining an access probability employs an algorithm particularly suited to a web browsing application and wherein a file is considered as being available only if the file is directly linked to a page being currently displayed by the local computer, further comprising:

means for maintaining a page counter $C_A$ for each page A;

means for determining if a link to a page B exists from page A and for maintaining a link counter $C_{(A,B)}$ for the pair if the link exists;

means for incrementing $C_A$ whenever page A is downloaded;

means for incrementing $C_{(A,B)}$ whenever page B is accessed by means of the link; and means for determining the access probability $\rho$ of a page $B_i$ linked to the page A being displayed by the local computer according to $$p(Bi|A) = \min\left(1, \frac{C_{(A,B_i)}}{C_A}\right)$$

for $C_A \geq 5$, and 0 for $C_A < 5$.

10. An apparatus for reducing latency of requests by a local computer for computer files available from a computer network by prefetching a subset of available computer files to the local computer comprising:

means for determining an access probability for each computer file available to the local computer wherein the access probability of a file is an estimate of the probability with which the file will be requested by the local computer and wherein determining the access probability employs an application specific algorithm;

means for determining a prefetch threshold, based on current network conditions for each computer network server containing at least one file with nonzero access probability wherein determining a prefetch threshold employs an algorithm that is not application specific; and means for prefetching each file whose access probability exceeds or equals it's server's prefetch threshold if there is no current copy of the file already on the local computer, wherein the means for determining a prefetch threshold operates according to an equation where $\alpha_T$ represents a delay cost, $\alpha_B$ represents a system resource cost, b represents capacity of a pathway for conducting a prefetched file to the local computer, $\rho$ represents an overall load of the computer network, and where the equation is given by $$H = 1 - \frac{(1-\rho)\frac{\alpha_T}{\alpha_B}}{(1-\rho)^2 b + \frac{\alpha_T}{\alpha_B}}.$$

11. An apparatus for reducing latency of requests by a local computer for computer files available from a computer network by prefetching a subset of available computer files to the local computer comprising:

means for determining an access probability for each computer file available to the local computer wherein the access probability of a file is an estimate of the probability with which the file will be requested by the local computer and wherein determining the access probability employs an application specific algorithm;

means for determining a prefetch threshold, based on current network conditions for each computer network server containing at least one file with nonzero access probability wherein determining a prefetch threshold employs an algorithm that is not application specific; and means for prefetching each file whose access probability exceeds or equals it's server's prefetch threshold if there is no current copy of the file already on the local computer, wherein the means for determining a prefetch threshold operates according to an equation where $\alpha_T$ represents a delay cost, $\alpha_B$ represents a system resource cost, b represents capacity of a pathway for conducting a prefetched file to the local computer, $\rho$ represents an overall load of the computer network, s represents a size of the prefetched file and where the equation is given by $$H = 1 - \frac{(1-\rho)\left(1 + \frac{s_0}{s}\right)\frac{\alpha_T}{\alpha_B}}{(1-\rho)^2 b + \left(1 + \frac{s_0}{s}\right)\frac{\alpha_T}{\alpha_B}}.$$

12. An apparatus for reducing latency of requests by a local computer for computer files available from a computer network by prefetching a subset of available computer files to the local computer comprising:

means for determining an access probability for each computer file available to the local computer wherein the access probability of a file is an estimate of the probability with which the file will be requested by the local computer and wherein determining the access probability employs an application specific algorithm;

means for determining a prefetch threshold, based on current network conditions for each computer network server containing at least one file with nonzero access probability wherein determining a prefetch threshold employs an algorithm that is not application specific; and means for prefetching each file whose access probability exceeds or equals it's server's prefetch threshold if there is no current copy of the file already on the local computer, wherein the means for determining a prefetch threshold determines a prefetch threshold $H_k$ for a user k by using an equation where $\alpha_T$ represents a delay cost, $\alpha_B$ represents a system resource cost, b represents capacity of a pathway for conducting a prefetched file to the local computer, $\rho$ represents an overall load of the computer network, s represents a size of the prefetched file, and $\lambda$ represents a file request rate and where the equation is given by $$H_k = 1 - \frac{\alpha_{T_k}\left[b - \sum_{i=1}^{n}(\lambda_{i_1} + \lambda_{i_2})s\right]}{\alpha_B\left[b - \sum_{i=1}^{n}(\lambda_{i_1} + \lambda_{i_2})s\right]^2 + s\sum_{i=k}^{n}\lambda_{i_1}\alpha_{T_i} + \alpha_{T_k}\left[b - \sum_{i=1}^{n}(\lambda_{i_1} + \lambda_{i_2})s\right]}$$

$$= 1 - \frac{(1-\rho)\frac{\alpha_{T_k}}{\alpha_B}}{(1-\rho)^2 b + (1-\rho)\frac{\alpha_{T_k}}{\alpha_B} + \frac{s}{b\alpha_B}\sum_{i=k}^{n}\lambda_{i_1}\alpha_{T_i}}.$$

* * * * *

UNITED STATES PATENT AND TRADEMARK OFFICE
CERTIFICATE OF CORRECTION

PATENT NO.    : 6,385,641 B1
DATED         : May 7, 2002
INVENTOR(S)   : Jiang et al.

It is certified that error appears in the above-identified patent and that said Letters Patent is hereby corrected as shown below:

Column 1,
Line 5, insert the following paragraph:
-- This invention was made with Government support under Grant No. DABT63-94-C-0080, awarded by the U.S. Army. The Government has certain rights in this invention. --

Signed and Sealed this

Eighth Day of October, 2002

Attest:

JAMES E. ROGAN
Attesting Officer        Director of the United States Patent and Trademark Office